(12) United States Patent
Mani et al.

(10) Patent No.: US 10,366,182 B2
(45) Date of Patent: Jul. 30, 2019

(54) METHODS AND APPARATUS TO MODEL THERMAL MIXING FOR PREDICTION OF MULTI-STREAM FLOWS

(71) Applicant: The Boeing Company, Chicago, IL (US)

(72) Inventors: Mortaza Mani, St. Louis, MO (US); Nicholas J. Moffitt, St. Peters, MO (US); Andrew James Dorgan, Edwardsville, IL (US)

(73) Assignee: The Boeing Company, Chicago, IL (US)

( * ) Notice: Subject to any disclaimer, the term of this patent is extended or adjusted under 35 U.S.C. 154(b) by 395 days.

(21) Appl. No.: 14/806,373

(22) Filed: Jul. 22, 2015

(65) Prior Publication Data

US 2017/0024496 A1  Jan. 26, 2017

(51) Int. Cl.
*G06F 17/50* (2006.01)
*G06F 17/11* (2006.01)

(52) U.S. Cl.
CPC .......... *G06F 17/5009* (2013.01); *G06F 17/11* (2013.01); *G06F 17/5018* (2013.01); *G06F 17/5095* (2013.01); *G06F 2217/16* (2013.01); *G06F 2217/80* (2013.01)

(58) Field of Classification Search
CPC .. G06F 17/5009; G06F 17/11; G06F 17/5018; G06F 17/5095; G06F 2217/16; G06F 2217/80
See application file for complete search history.

(56) References Cited

U.S. PATENT DOCUMENTS

| 7,207,520 B2* | 4/2007 | Lundy | G06F 17/5095 137/15.2 |
| 8,457,939 B2* | 6/2013 | Rodriguez | G06F 17/5018 703/1 |
| 2008/0126038 A1* | 5/2008 | Alvarez | G06F 17/5018 703/6 |
| 2012/0232860 A1* | 9/2012 | Rodriguez | G06F 17/5018 703/2 |
| 2014/0145001 A1* | 5/2014 | Winkler | F02K 1/002 239/1 |

(Continued)

OTHER PUBLICATIONS

Saegeler et al, Advance Numerical SImulation of Mixing Hot Core and Cold Bypass FLow in Modern Propulsion Systems with Internal Lobed Forced Mixer, AIAA 2013-2424, Jun. 24-27, 2013, p. 1-16.*

(Continued)

*Primary Examiner* — Rehana Perveen
*Assistant Examiner* — Chuen-Meei Gan
(74) *Attorney, Agent, or Firm* — Hanley, Flight & Zimmerman, LLC

(57) ABSTRACT

Methods and apparatus to model thermal mixing for prediction of multi-stream flows are described. An example method includes determining characteristics of a nozzle of an aircraft; estimating momentum diffusion due to turbulence associated with the nozzle based on the determined characteristics; and estimating thermal diffusion due to the turbulence associated with the nozzle based on the estimated momentum diffusion, wherein the estimating of the thermal diffusion due to the turbulence is based on a spatially varying turbulent Prandtl number.

14 Claims, 15 Drawing Sheets

(56) References Cited

U.S. PATENT DOCUMENTS

2015/0354498 A1* 12/2015 Winkler .................... F02K 1/30
239/11

OTHER PUBLICATIONS

Le et al, A physical picture of the mechanism of turbulent heat transfer from the wall, International Journal of Heat and Mass Transfer 52(2009)4873-4882.*
Dong et al, An investigation of the Prandtl number effect on turbulent heat transfer in channel flows by large eddy simulation, ACTA Mechanica 159, 39-51 (2002).*
Uriel Goldberg et al, Variable turbulent schmidt and prandtl number, Engineering Applications of Computational Fluid Mechnics, 2010, p. 511-520.*
Mahdi Mohseni et al, Effect of Turbulent Prandtl Number on Convective Heat Transfer to Turbulent Flow of a Supercritical Fluid in a Vertical, Journal of Heat Transfer1 by ASME Jul. 2011, vol. 133 / 071701-1 (Year: 2011).*
Karimpour, F., and S. K. Venayagamoorthy (2014), A simple turbulence model for stably stratified wall-bounded flows, J. Geophys. Res. Oceans, 119, 870-880, doi:10.1002/ (Year: 2014).*
A.S. Kozelkov, A.A. Kurkin, V.V. Kurulin, M.A. Legchanov, E.S. Tyatyushkina, Yu.A. Tsibereva, Investigation of the Application of RANS Turbulence Models to the Calculation of Nonisothermal Low-Prandtl-Number Flows Fluid Dynamics, 2015, vol. 50, No. 4, pp. 501-513. (Year: 2015).*
Eric C. Marineau et al, Turbulent Navier-Stokes Simulations of Heat Transfer with Complex Wall Temperature Variations 9th AIAA/ASME Joint Thermophysics and Heat Transfer Conference, Jun. 5-8, 2006, San Francisco, California (Year: 2006).*
Adam Powell, 3.21 Lectures on Fluid Flow and Kinetics, p. 1-26, Apr. 2330, 2003 (Year: 2003).*
Byung Gil Huh, Sin Kim and Chang Hyun Chung, The Turbulent Prandtl Number for Temperature Analysis in Rod Bundle Subchannels, Journal of Nuclear Science and Technology, vol. 42, No. 2, p. 183-190 (Feb. 2005) (Year: 2005).*
Lecture note, Dot and Cross Product Oct. 31, 2007 (Year: 2007).*
European Patent Office, "Extended European Search Report," issued in connection with European Patent Application No. 16179894.7, dated Jan. 3, 2017, 10 pages.
Lai et al., "Near-wall modeling of turbulent heat fluxes," International Journal of Heat and Mass Transfer, vol. 33, No. 7, 1990. pp. 1429-1440.
Aouissi et al.,"Scalar turbulence model investigation with variable turbulent Prandtl number in heated jets and diffusion flames," Heat and Mass Transfer, vol. 44, No. 9, Oct. 9, 2007, pp. 1065-1077.
Volkov, K. N., "Large Eddy Simulation of a Nonisothermal Turbulent Jet Flowing out into Submerged Space," High Temperature, vol. 46, No. 5, Sep. 23, 2008, pp. 630-638.
Saegeler et al., "Advanced Numerical Simulation of Mixing Hot Core and Cold Bypass Flow in Modern Propulsion Systems with Internal Lobed Forced Mixer," 21st AIAA Computational Fluid Dynamics Conference, Jun. 22, 2013, 17 pages.
Abdol-Hamid et al., "Temperature Corrected Turbulence Model for High Temperature Jet Flow," Journal of Fluids Engineering, vol. 126, No. 5, 2004, pp. 844-850, 11 pages.
Birch et al., "Numerical Modeling Requirements for Coaxial and Chevron Nozzle Flows," AIAA 2003-3287, 9th AIAA/CEAS Aeroacoustics Conference and Exhibit, May 12-14, 2003, Hilton Head, South Carolina, 2003, 11 pages.
Bush, R.H., "Turbulence Model Extension for Low Speed Thermal Shear Layers," AIAA 2014-2086, 44th AIAA Fluid Dynamics Conference, Atlanta, GA, Jun. 16-20, 2014, 12 pages.
Dupland et al., "A New Explicit Algebraic Model for Turbulent Heat Flux Prediction," HEFAT2005, Paper No. DL1, 4th International Conference on Heat Transfer, Fluid Mechanics and Thermodynamics, Cairo, Egypt, 2005, 12 pages.
Le et al., "A Physical Picture of the Mechanism of Turbulent Heat Transfer from the Wall," International Journal of Heat and Mass Transfer, vol. 52, 2009, pp. 4873-4882, 10 pages.
Saegeler et al., "Advanced Numerical Simulation of Mixing Hot Core and Cold Bypass Flow in Modern Propulsion Systems with Internal Lobed Forced Mixer," AIAA 2013-2424, 21st AIAA Computational Fluid Dynamics Conference, Jun. 24-27, 2013, San Diego, CA, 2013, 16 pages.
Seki et al., "Proposal of Turbulent Heat Flux Model with Consideration of Linearity and Its Application of Turbulent Channel Flow with Various Thermal Boundary Conditions," Turbulence, Heat and Mass Transfer, vol. 4, 2003, 8 pages.
So et al., "An Explicit Algebraic Heat-Flux Model for the Temperature Field," International Journal of Heat and Mass Transfer, vol. 39, No. 3, 1996, pp. 455-465, 12 pages.
Sturgess, et al., "Calculations of Turbulent Mass Transport in a Bluff-Body Diffusion-Flame Combustor," AIAA-84-0372, AIAA 22nd Aerospace Sciences Meeting, Jan. 9-12, 1984, Reno, Nevada, 1984, 12 pages.
Suzen et al., "Investigation of Supersonic Jet Exhaust Flow by One- and Two-Equation Turbulence Models," AIAA-1998-16215, 36th Aerospace Sciences Meeting and Exhibit, Jan. 12-15, 1998, Reno, NV, 1998, 12 pages.
Thakre et al., "CFD Modeling of Heat Transfer in Turbulent Pipe Flow," AIChE Journal, vol. 46, No. 9, 2000, 15 pages.
Wilcox, D.C, Turbulence Modeling for CFD, 2nd Ed., DCW Industries, Inc., 1998, cover page, pp. 227 & 238, 3 pages.
Lai et al., "Near-wall modeling of turbulent heat fluxes," International Journal of Heat and Mass Transfer, vol. 33, No. 7, 1990,12 pages.
European Patent Office, "Communication pursuant to Article 94(3) EPC," issued in connection with European Patent Application No. 16 179 894.7, dated Feb. 9, 2018, 6 pages.
European Patent Office, "Communication pursuant to Article 94(3) EPC," issued in connection with European Patent Application No. 16 179 894.7, dated Sep. 17, 2018, 6 pages.

* cited by examiner

METHODS AND APPARATUS TO MODEL THERMAL MIXING FOR PREDICTION OF MULTI-STREAM FLOWS

FIELD OF THE DISCLOSURE

This disclosure relates generally to aircraft and, more particularly, to methods and apparatus to model thermal mixing for prediction of multi-stream flows.

BACKGROUND

Design of a propulsion system involves selecting appropriate materials and geometries for use in, for example, nozzle design. Factors considered in the selection of the materials include nozzle wall temperatures at different points along the nozzle wall. That is, a distribution of nozzle wall temperatures is useful information when designing and evaluating nozzles of propulsion systems.

SUMMARY

An example method includes determining, via a processor, characteristics of a nozzle of an aircraft; estimating, via the processor, momentum diffusion due to turbulence associated with the nozzle based on the determined characteristics; and estimating, via the processor, thermal diffusion due to the turbulence associated with the nozzle based on the estimated momentum diffusion, wherein the estimating of the thermal diffusion due to the turbulence is based on a spatially varying turbulent Prandtl number.

An example apparatus includes a domain analyzer to determine characteristics of a nozzle of an aircraft; a first estimator to estimate momentum diffusion due to turbulence associated with the nozzle based on the determined characteristics; and a second estimator to estimate thermal diffusion due to the turbulence associated with the nozzle based on the estimated momentum diffusion, wherein the second estimator is to use a spatially varying turbulent Prandtl number to estimate the thermal diffusion due to the turbulence.

An example tangible computer readable storage medium comprises example instructions that, when executed, cause a machine to at least determine characteristics of a nozzle of an aircraft; estimate momentum diffusion due to turbulence associated with the nozzle based on the determined characteristics; and estimate thermal diffusion due to the turbulence associated with the nozzle based on the estimated momentum diffusion, wherein the estimating of the thermal diffusion due to the turbulence is based on a spatially varying turbulent Prandtl number.

DETAILED DESCRIPTION

Figure 1:
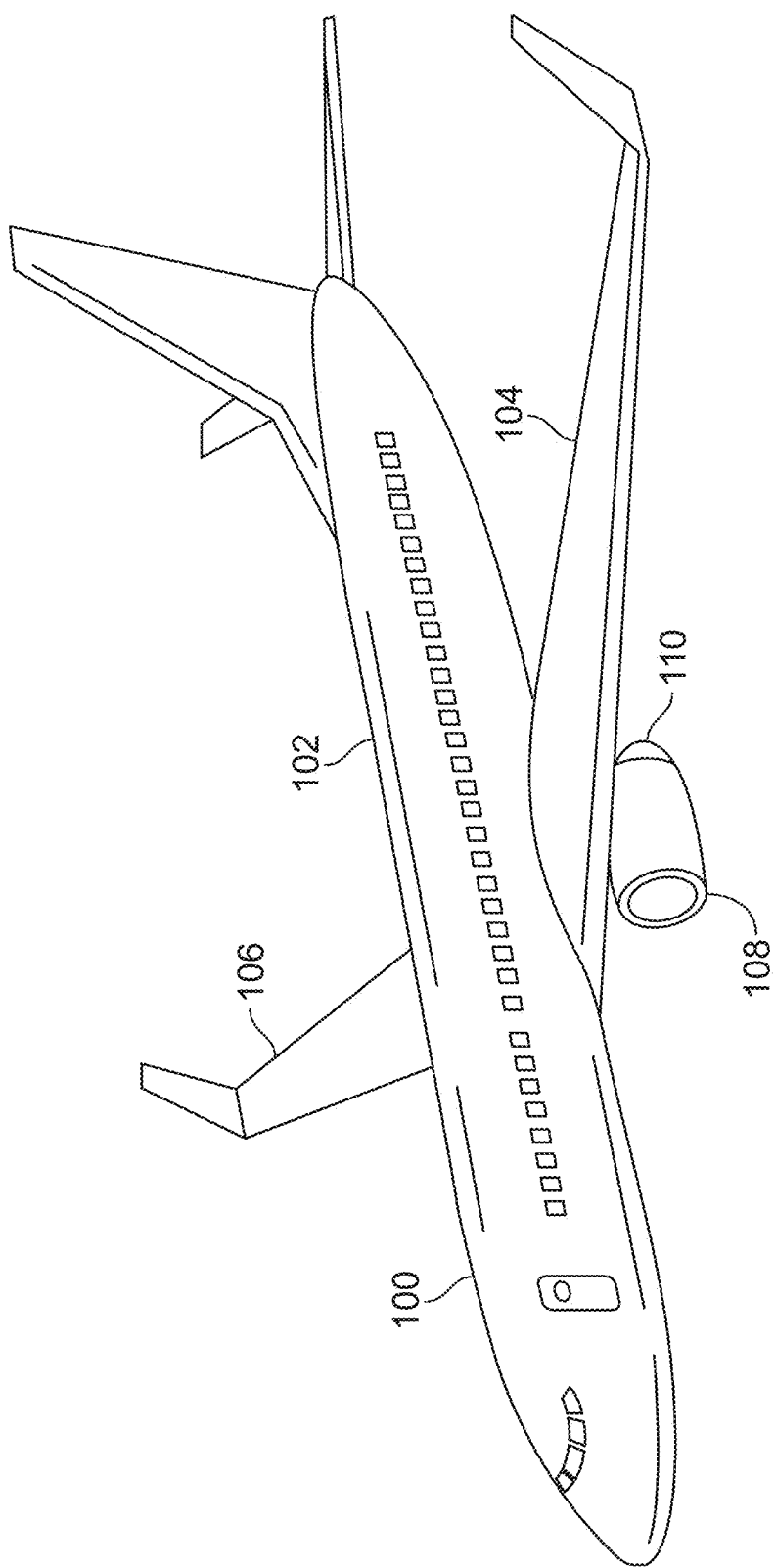
FIG. 1 is an example aircraft for which examples disclosed herein may be utilized.

FIG. 1 illustrates an example aircraft 100 for which example methods and apparatus disclosed herein may be utilized. While the example aircraft 100 is illustrated in FIG. 1, the example methods and apparatus disclosed herein may be implemented in connection with other types of aircraft propelled by one or more jet engines. The example aircraft 100 of FIG. 1 is a commercial airplane having a fuselage 102 that is typically used to carry payload, such as passengers and/or cargo. The example aircraft 100 of FIG. 1 includes left and right wings 104 and 106. Each of the left and right wings 104 and 106 has an inboard portion and an outboard portion. The inboard portions of the wings 104 and 106 are closer to the fuselage 102 than the outboard portions.

A propulsion system including propulsors (e.g., jet engines, turbofan engines, geared turbofan engines, etc.) coupled to the wings 104 and 106 provides the aircraft 100 with thrust. In the illustrated example, a propulsor 108 is shown mounted to the left wing 104. Another propulsor (not shown) is mounted to the right wing 106. However, the example propulsor 108 and/or any other propulsor of the aircraft 100 may be positioned elsewhere on the aircraft 100. The wings 104 and 106 include a plurality of control surfaces (e.g., flaps, spoilers, ailerons, rudders, etc.) that are controlled by pilots and/or an auto-pilot system to operate the aircraft 100.

The example propulsor 108 of FIG. 1 includes a nozzle 110 that converts energy into a propelling jet. Design and operation of the nozzle 110 involves developing knowledge of different aspects and behaviors of the nozzle 110. In some instances, one or more models are used to predict, for example, temperatures and/or jet plume acoustics associated with the nozzle 110. Accurate prediction of multi-stream mixing flows at large temperature differentials is essential for prediction of exhaust nozzle wall temperatures and RANS (Reynolds-Averaged Navier-Stokes) estimates of jet plume acoustics. A known approach for such predictions assumes that turbulent thermal diffusion can be scaled from turbulent momentum diffusion. Turbulent viscosity, which is used to calculate momentum diffusion, is scaled by a turbulent Prandtl number and used to scale the thermal diffusion. The turbulent Prandtl number is often chosen from boundary layer data and assumed constant throughout the entire flowfield. Examples disclosed herein recognize that this choice under-predicts thermal diffusion in mixing layers. Furthermore, mixing layer predictions become worse as the velocity difference between the streams diminishes. The shortcoming in this approach is associated with the treatment of the turbulent heat flux vector term in the RANS energy equation.

Multiple mixing streams with large temperature differences have raised concerns that corrections and/or adjustments to the RANS equations may be desirable for accurate predictions of these flowfields. Experimental results indicate that, for a coannular flow with a small relative velocity difference and large thermal gradients between the two streams, the flow in the two streams was subsonic (Mach 0.2 to 0.4) and demonstrated the persistence of thermal mixing as the velocity gradient was diminished. Therefore, any model that aims to accurately predict the flowfields should capture this trend.

Turbulence models have been tuned to capture the momentum transport in many different flowfields. The eddy diffusivity model is the traditional approach to modeling thermal diffusion. Eddy diffusivity creates one additional coefficient, the turbulent Prandtl number $Pr_\tau$, which can be tuned to improve temperature predictions. Examples disclosed herein recognize that a single coefficient is insufficient to relate the momentum and thermal diffusion in complex flowfields. Examples disclosed herein recognize that the turbulent Prandtl number appropriate for a boundary layer may not be accurate for a free shear layer, so a flowfield containing both of these simple problems becomes too complex to model with a constant $Pr_\tau$. It is possible to alter the turbulent Prandtl number based on location in the flowfield. Some approaches model turbulent heat flux directly. Differential heat flux models treat the turbulent heat flux vector like other turbulent quantities that are modeled with advection, diffusion, production, and dissipation. Algebraic heat flux models have been created to retain much of the accuracy of their differential counterparts at a reduced cost and complexity.

Examples disclosed herein provide a variable $Pr_\tau$ model with the use of an algebraic turbulent heat flux equation. Some examples disclosed herein utilize BCFD (Boeing Computational Fluid Dynamics) code to implement a Lai-So model and the variable $Pr_\tau$ model disclosed herein. In particular, the utilized BCFD code is a general geometry and general purpose Euler and Navier-Stokes flow solver that accommodates both structured and unstructured grids. BCFD code solves the governing equations for fluid dynamics using a density-based finite-volume approach. The unstructured solver is cell-centered, spatially second-order accurate, and utilizes an implicit discretization based on a first-order exact linearization of the fluxes. The reconstructed states are combined to form a numerical flux through each face using one of a variety of high-resolution inviscid flux functions. Viscous terms may be treated with a "full Navier-Stokes" or "pseudo-thin layer" approach. For steady-state computations, the RANS equations are closed by one of a suite of available turbulence models, including the Spalart-Allmaras model and shear stress transport (SST) model. Examples described in detail below utilize unstructured grids, the full Navier-Stokes discretization, and the SST turbulence model.

Examples disclosed herein recognize deficiencies in the traditional eddy diffusivity model. When the energy equation is Reynolds-averaged, a term appears, $c_p \rho \overline{u_j' T'}$, that represents the turbulent transport of heat or turbulent heat flux vector, where $\rho$ is density, $c_p$ is specific heat at constant pressure, T is static temperature, $u_j$ is velocity vector (u, v, w), and $\overline{u_j' T'}$ is turbulent heat flux. Often, turbulent thermal diffusion is assumed to be directly related to turbulent momentum diffusion. The most common approach is to model the turbulent transport of heat by scaling eddy viscosity with a global constant, the so-called turbulent Prandtl number. Eddy viscosity models, whether differential or algebraic in nature, have been tuned to adequately represent the turbulent diffusion of momentum on canonical problems, but not necessarily the turbulent transport of heat.

The turbulent heat flux has historically been modeled using the Reynolds analogy, patterned after heat conduction. Heat conduction relates the molecular transport of heat to the temperature gradient through thermal conductivity $\kappa$, which can be modeled as the ratio of molecular viscosity, $\mu$, and Prandtl number, Pr. The turbulence model relates the turbulent transport of heat to the temperature gradient using an eddy diffusivity term, or turbulent thermal conductivity, $\kappa_\tau$. The eddy diffusivity model can be similarly expanded to use eddy viscosity, $\mu_\tau$, and turbulent Prandtl number, $Pr_\tau$:

$$\rho \overline{u_j' T'} = -\kappa_\tau \frac{\partial T}{\partial x_j} = -\frac{\mu_\tau}{Pr_\tau} \frac{\partial T}{\partial x_j} \qquad \text{Equation 1}$$

where is $\mu_\tau$ is turbulent viscosity and $x_j$ is coordinate location (x, y, z).

Although a single value ($Pr_\tau$=0.9) has become common (e.g., within the CFD community), the value has been shown to be different in a free shear layer (i.e., $Pr_z$~0.5) than near a wall where $Pr_\tau$~0.9 in the log-layer. Some approaches use this information to create a variable $Pr_\tau$ model. Alternatively, some approaches avoid the use of a turbulent Prandtl number by using a differential or algebraic model for the turbulent heat flux vector.

Eddy diffusivity has its advantages and disadvantages. Eddy viscosity increases with the presence of a dominant velocity gradient, so the turbulent transport of heat is increased when a velocity and temperature gradient are both present in the flow. In turbulent flows with small velocity gradients, the turbulent transport of heat may still be dominant in the physics but misrepresented by a single coefficient in the eddy diffusivity model. Eddy diffusivity creates an estimate of the turbulent heat flux vector that is aligned with the temperature gradient, whereas the turbulent transport of heat (e.g., the $c_p \rho \overline{u_j' T'}$ term above) arises from fluctuations in each velocity component and may not be aligned with the temperature gradient.

Most CFD codes apply a constant turbulent Prandtl number that is estimated from experimental data. Wall-bounded flows have been characterized by thermal boundary layer data, which suggests that a constant turbulent Prandtl number of 0.9 can be used near a wall. Data collected within free shear layers has shown a value of 0.5 is appropriate away from a wall. Some approaches vary the value of the turbulent Prandtl number from 0.9 to 0.5, where 0.5 is most appropriate at the edge of the boundary layer. A zonal model may be created to represent axisymmetric jets. For example, a turbulent Prandtl number of 0.4 may be applied in the potential core, 0.7 in the remaining mixing layer, and 0.9 within the boundary layer. Such a zonal model has been designed for a specific family of commercial engine nozzles and requires a priori knowledge of the flow-field.

The previous guidelines are taken in the light of uncertainty. Experiments have been conducted that analyzed different wall bounded flows with a direct numerical simulation (DNS) of the flow equations. Results of these experiments show that turbulent Prandtl number is nearly constant over the boundary layer (~0.9 to 1.0) with uncertainty estimates that can arise as much as 50%.

Figure 2:
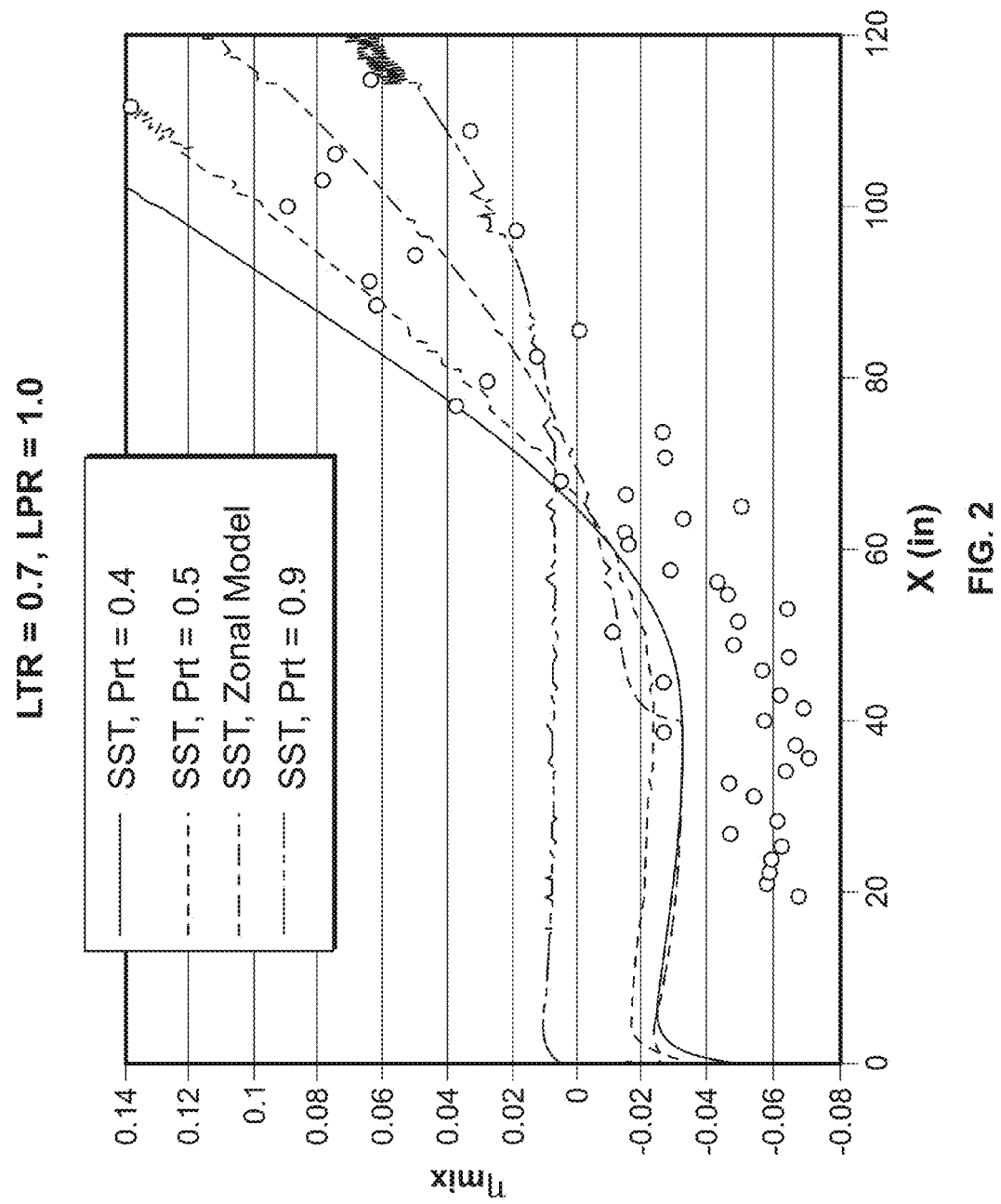
FIG. 2 is a first graph illustrating wall temperature profiles.

Tests have been performed on a coannular exhaust into a constant area duct. FIG. 2 shows one case where experimental data is compared to CFD simulations using the SST turbulence model and three constant turbulent Prandtl numbers as well as a zonal model. The example of FIG. 2 illustrates wall temperature profiles corresponding to constant turbulent Prandtl numbers and zonal turbulent Prandtl numbers. In the example of FIG. 2, $\eta_{mix}$ is a dimensionless mixing temperature. In particular, $\eta_{mix}=(T_w-T_{t,bypass})/(T_{mix}-T_{t,bypass})$. In the example of FIG. 2, x is a distance (e.g., inches) downstream of a splitter plate. In the example of FIG. 2, the dots represent experimental data. For $Pr_\tau=0.9$, the model under-predicts the heat transfer, whereas smaller values ($Pr_\tau=0.4$ or 0.5) over-predict the wall temperature. Notably, the results of this zonal module depend on the assumed core length (where $Pr_\tau=0.4$). In FIG. 2, LTR is the Linear Temperature Ratio ($T_{t,bypass}/T_{t,core}$) and LPR is the Linear Pressure Ratio ($p_{t,bypass}/p_{t,core}$).

Figure 3:
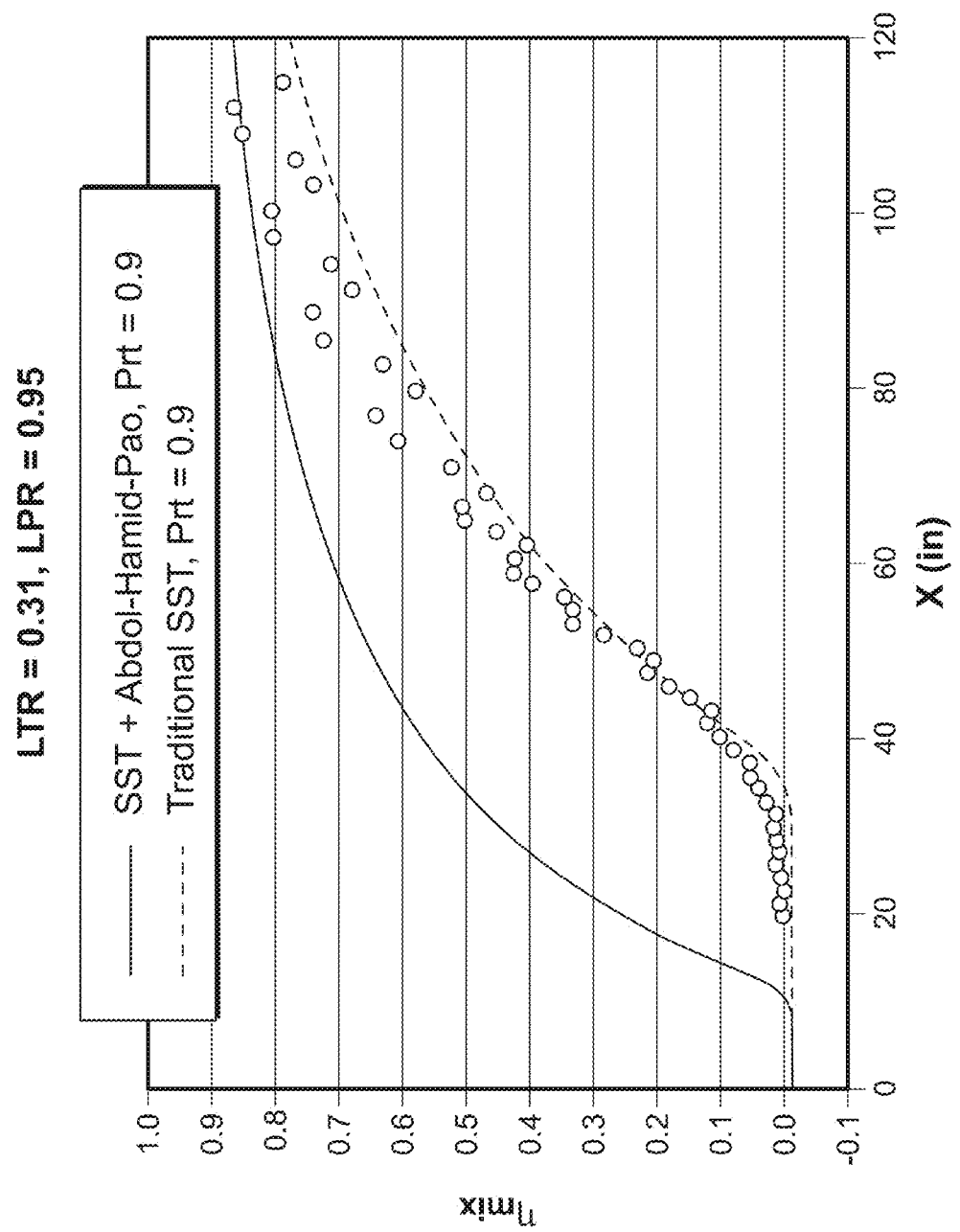
FIG. 3 is a second graph illustrating wall temperature profiles.

Some approaches have attempted to correct the thermal diffusion by increasing the eddy viscosity in the presence of temperature gradients. Some such approaches base the corresponding model on an observation from experimental results that a "density gradient in a turbulent flow would add to instability due to local acceleration in the turbulent velocity field." (Abdol-Hamid, K. S., Pao, S. P., Massey, S. J., Elmiligui, A., "Temperature Corrected Turbulence Model for High Temperature Jet Flow," *Journal of Fluids Engineering*, Vol. 126, No. 5, 2004, pp. 844-850). Some such approaches constructed an empirical model capable of accurately representing some cases. However, examples disclosed herein recognize that this empirical model cannot be applied accurately in general. FIG. 3 shows a comparison of the traditional approach ($Pr_\tau=0.9$) and the empirical model of Abdol-Hamid-Pao applied to a coannular mixing problem. The dots in FIG. 3 correspond to experimental results. In FIG. 3, LTR is the Linear Temperature Ratio ($T_{t,bypass}/T_{t,core}$) and LPR is the Linear Pressure Ratio ($p_{t,bypass}/p_{t,core}$). As shown in FIG. 3, the traditional approach slightly under-predicts the wall temperatures, but the empirical model over-predicts the wall temperatures. Thus, examples disclosed herein recognize that adapting the eddy viscosity to the thermal field affects not only the thermal diffusion but also the diffusion of momentum, which could invalidate the tuning of the eddy viscosity model.

Some approaches involve differential models for turbulent heat flux. Other models were created to simulate the turbulent kinetic energy in the temperature fluctuations, $k_\theta$, and its dissipation, $\varepsilon_\theta$. One known approach known as the Lai-So model is illustrated in the following equation with Seki's molecular diffusion term:

$$\frac{\partial \rho \overline{u'_j T'}}{\partial t} + \frac{\partial u_m \rho \overline{u'_j T'}}{\partial x_m} = \quad \text{Equation 2}$$

-continued $$\frac{\partial}{\partial x_k}\left(c_s^\theta \frac{k}{\varepsilon}\left(-\rho \tau_{jl}\frac{\partial \overline{u'_j T'}}{\partial x_l} - \rho \tau_{kl}\frac{\partial \overline{u'_j T'}}{\partial x_l}\right)\right) +$$

$$\frac{\partial}{\partial x_m}\left(\frac{1}{2}\left(\mu + \frac{\mu}{Pr}\right)\frac{\partial \overline{u'_j T'}}{\partial x_m} + \frac{1}{6}\left(\mu - \frac{\mu}{Pr}\right)\hat{n}_j\hat{n}_n\frac{\partial \overline{u'_j T'}}{\partial x_m}\right) +$$

$$\rho\tau_{jm}\frac{\partial T}{\partial x_m} - \rho\overline{u'_j T'}\frac{\partial u_j}{\partial x_m} - c_{1\theta}\frac{\varepsilon}{k}\rho\overline{u'_j T'} + c_{2\theta}\rho\overline{u'_j T'}\frac{\partial u_j}{\partial x_k} -$$

$$c_{1\theta,w}\frac{\varepsilon}{k}\rho\overline{u'_j T'}\hat{n}_k\hat{n}_j\frac{k^{3/2}}{\varepsilon d_w} + f_{w,\theta}\left(c_{1\theta}\frac{\varepsilon}{k}\rho\overline{u'_j T'} - \frac{\varepsilon}{k}\rho\overline{u'_j T'}\hat{n}_k\hat{n}_j\right) -$$

$$\frac{1}{2}f_{w,\theta}\left(1 + \frac{1}{Pr}\right)\frac{\varepsilon}{k}\left(\rho\overline{u'_j T'} + (\rho\overline{u'_j T'}\cdot\hat{n}_m)\hat{n}_j\right)$$

where $f_{w,\theta}=\exp(-(Re_\tau/Re_{\tau,0})^2)$ and $Re_\tau=\rho k^2/\mu\varepsilon$ and $\hat{n}$ is a wall normal vector of nearest wall face ($(\hat{n}=\nabla d_w/|\nabla d_w|)$). The coefficients are nominally: $c_{1\theta}=3.0$, $c_{2\theta}=0.4$, $c_{1\theta,w}=0.75$, and $Re_{\tau,0}=80$. In this approach, suggested values for $c_s^\theta$ are either 0.11 or 0.20. Numerical experiments showed that the model is relatively insensitive to $c_s^\theta$ or $Re_{\tau,0}$. The wall coefficient $c_{1\theta,w}$ has a strong influence on the turbulent heat flux vector near the wall, and $c_{1\theta}$ has a strong influence on the heat flux in both mixing and boundary layers.

Algebraic Reynolds stress models are prevalent throughout turbulence modeling approaches. Another known model for transporting scalar quantities in turbulent flows incorporates an additional term in the denominator to account for non-equilibrium flow (i.e., $P_k \neq \varepsilon$). This known model solved for the turbulent Prandtl number that is effective normal to a wall, which is approximately 0.4 for equilibrium flows. Another example model starts with the high-Reynolds terms (e.g., from the Lai-So model) and makes several modeling assumptions in the derivation and employs a time-scale that is a mixture of momentum, $\varepsilon/k$, and thermal, $\varepsilon_\theta/k_\theta$, rates. The thermal (turbulent) kinetic energy and dissipation are calculated by the addition of a two-equation $k_\theta$-$\varepsilon_\theta$ model.

Examples disclosed herein provide an algebraic turbulent heat flux model to improve thermal diffusion modeling. As disclosed in detail below, in contrast to known approaches that assume thermal diffusion to be proportional to the momentum diffusion, examples disclosed herein enable a higher fidelity approach, which obtains an accurate estimate of turbulent thermal diffusion by solving a relationship more cognizant of the true physics governing the issue. In particular, examples disclosed herein provide a spatially varying turbulent Prandtl number.

Examples disclosed herein implement the Lai-So model (Lai, Y. G., So, R. M. C., "Near-Wall Modeling of Turbulent Heat Fluxes," *International Journal of Heat and Mass Transfer*, Vol. 33, No. 7, 1990, pp. 1429-1440) into, for example, BCFD for use with Menter's SST model (Menter, F. R., Kuntz, M., Langtry, R., "Ten Years of Industrial Experience with the SST Turbulence Model," *Turbulence, Heat and Mass Transfer* 4, Editors: K. Hanjalic, Y. Nagano, M. Tummers, Begell House, Inc., pp. 625-632, 2003). The example algebraic model disclosed herein is based on the source terms of Lai and So. To enhance stability, examples disclosed herein calculate a local turbulent Prandtl number from the turbulent heat flux vector that results from the model. Examples disclosed herein apply the turbulent Prandtl number through the standard eddy diffusivity approach, resulting in the spatially varying turbulent Prandtl number ($Pr_\tau$).

In some examples, the Lai-So model is implemented in BCFD using Seki's molecular diffusion term (Seki, Y. Kawamoto, N., Kawamura, H., "Proposal of Turbulent Heat Flux Model with Consderation of Linearity and Its Application of Turbulent Channel Flow with Various Thermal Boundary Conditions," *Turbulence, Heat and Mass Transfer*, Vol. 4, 2003). Several equations in the model contain the ratio of k/ε, where k is turbulent kinetic energy and ε is dissipation of turbulent kinetic energy. Lai and So applied their model along-side a k-ε model or Reynolds stress transport model with &closure equation. Examples disclosed herein apply the Lai-So model in conjunction with Menter's SST turbulence model in which ε is not directly available. As such, the k/ε terms were rewritten in terms of eddy viscosity, using the definition from the k-ε model (Eq. 3).

$$\mu_T = C_\mu \frac{\rho k^2}{\varepsilon} \quad \text{Equation 3}$$

$$\frac{k}{\varepsilon} = \frac{\mu_T}{\rho k C_\mu} \quad \text{Equation 4}$$

where $C_\mu = 0.09$.

Figure 4:
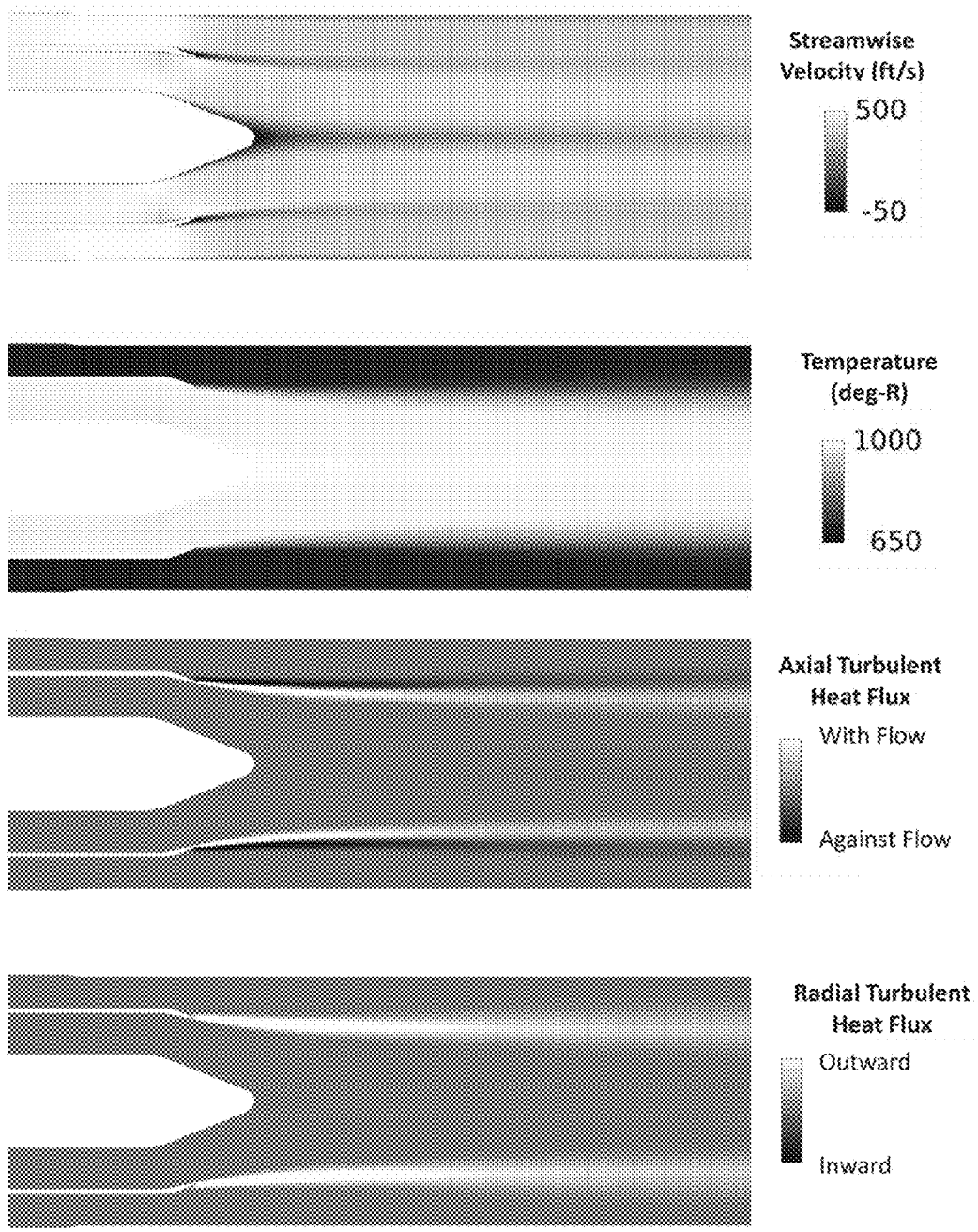
FIG. 4 is a distribution view of axial velocity, temperature, and turbulent heat flux.

The Lai-So model is demonstrated using only the high-Reynolds terms so that the results can be compared to other high-Reynolds models. FIG. 4 shows the distribution of axial velocity, temperature, and the turbulent heat flux vector in the coannular mixing case using the Lai-So model. The heat flux across the mixing layer is dominated by the radial flux $\rho \overline{v'T'}$, which peaks near the trailing edge of the splitter plate and decreases as the mixing layer diffuses downstream. The initial mixing also contains axial heat flux $\rho \overline{u'T'}$, which changes sign depending on the velocity gradient.

Examples disclosed herein estimate the turbulent Prandtl number using the heat flux across the mixing layer: $Pr_\tau \approx \mu_\tau |\nabla T|/|\rho \overline{v'T'}| \approx 0.4$. This value matches the predictions of Sturgess and McManus (Sturgess, G. J., McManus, K. R., "Calculations of Turbulent Mass Transport in a Bluff-Body Diffusion-Flame Combustor," *AIAA*-84-0372, AIAA 22$^{nd}$ Aerospace Sciences Meeting, 9-12 Jan. 1984, Reno, Nev., 1984). The ratio of axial to normal heat flux in the mixing layer ($\rho \overline{u'T'}/\rho \overline{v'T'} \approx -1.24$) is similar to that seen by Saegeler and Mundt (Saegeler, S. F., Mundt, C., "Advanced Numerical Simulation of Mixing Hot Core and Cold Bypass Flow in Modern Propulsion Systems with Internal Lobed Forced Mixer," *AIAA* 2013-2424, 21st AIAA Computational Fluid Dynamics Conference, Jun. 24-27, 2013, San Diego, Calif. 2014), who observed the ratio of heat fluxes to be −1.0 in the potential core and −1.375 downstream. Lai and So observed that the ratio of axial to radial heat flux within a round duct was also −1.375, compared to experimental results of −1.27. Lai and So also observed a turbulent Prandtl number of 0.8 over much of the round duct, and the value is created by the low-Reynolds number terms near the wall. The low-Reynolds terms are demonstrated below.

Known approaches, such as the approach of So and Summer (So, R. M. C., Sommer, T. P., "An Explicit Algebraic Heat-Flux Model for the Temperature Field," *International Journal of Heat and Mass* Transfer, Vol. 39, No. 3, 1996, pp. 455-465) started with the source terms from the high-Reynolds differential model while the examples disclosed herein includes the low-Reynolds source terms. Examples disclosed herein add a non-equilibrium correction to $c_{1\theta}$ in the same manner as Sturgess and McManus. In some examples disclosed herein, a model is implemented in BCFD, updated using a relaxed iterative approach, and the resulting heat flux is used to calculate a local $Pr_\tau$. It is known that the Lai-So model could be coupled with many k-ε models but works well with the models of Lai & So. This finding of examples disclosed herein suggests that the Lai-So model can be tuned to improve (e.g., better) performance with Menter's SST turbulence model.

Examples disclosed herein apply an assumption of equilibrium turbulence to the Lai-So model (Eq. 2). As shown below, the advection and diffusion terms are neglected, leaving only the source terms:

$$0 = \rho \tau_{jm} \frac{\partial T}{\partial x_m} - \rho \overline{u'_j T'} \frac{\partial u_j}{\partial x_m} - c_{1\theta} \frac{\varepsilon}{k} \rho \overline{u'_j T'} + \quad \text{Equation 5}$$

$$c_{2\theta} \rho \overline{u'_j T'} \frac{\partial u_j}{\partial x_m} - c_{1\theta,w} \frac{\varepsilon}{k} (\rho \overline{u'_j T'} \cdot \hat{n}_m) \hat{n}_j \frac{k^{3/2}}{\varepsilon d_w} +$$

$$f_{w,\theta} \frac{\varepsilon}{k} (c_{1\theta} \rho \overline{u'_j T'} - (\rho \overline{u'_j T'} \cdot \hat{n}_m) \hat{n}_j) -$$

$$\frac{1}{2} f_{w,\theta} \left(1 + \frac{1}{Pr}\right) \frac{\varepsilon}{k} (\rho \overline{u'_j T'} + (\rho \overline{u'_j T'} \cdot \hat{n}_m) \hat{n}_j)$$

Figure 5:
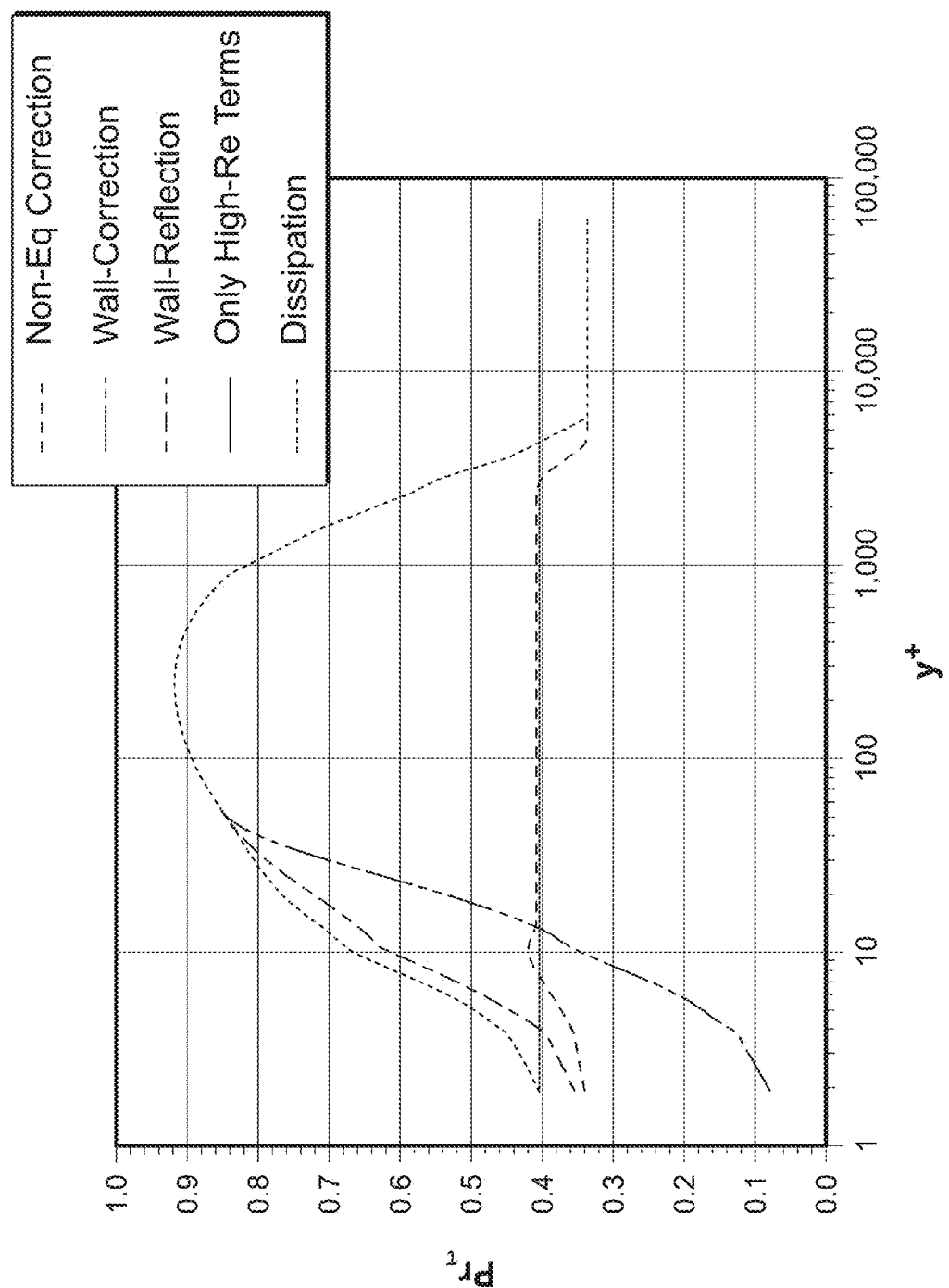
FIG. 5 is a first graph illustrating a distribution of a turbulent Prandtl number in a boundary layer.

The first four terms in Eq. 5 are the high-Reynolds number terms. These terms dominate the model away from the wall. Near the wall the remaining three terms become active. The fifth term is the wall-reflection term, which decreases the turbulent heat flux near the wall. This is shown in FIG. 5 by an increase in turbulent Prandtl number. FIG. 5 shows a distribution of the turbulent Prandtl number in a boundary layer presented as a component build-up. In FIG. 5, y+ is a distance above the wall in inner units. In particular, $y^+ = u_\tau d_w/v_w$. The sixth term is the wall-correction term, which Lai and So used to make the model behavior follow the asymptotic trends near the wall. The final term is the molecular dissipation. As shown in FIG. 5, the wall-correction and dissipation terms are most active between the log-layer and the wall. These two terms nearly cancel over this region. In some examples disclosed herein, the wall-correction and dissipation terms are not included in the model because of their large cost to compute and relatively small contributions to the resulting heat flux.

Sturgess and McManus added a non-equilibrium correction to $c_{1\theta}$. Equilibrium occurs when production of turbulent kinetic energy $P_k$ balances its dissipation ε. Equilibrium occurs primarily in the log-layer, but the production and dissipation are nearly balanced in the mixing layer. The effects of the non-equilibrium term can be seen in FIG. 5, where the non-equilibrium term is added to the high-Reynolds number terms.

Examples disclosed herein rearrange Equation 5 to provide a means of updating the turbulent heat flux vector. In particular, examples disclosed herein move the third term in Equation 5 to the left side and solve for the turbulent heat flux vector. Equation 6 shows the turbulent heat flux update in its final form:

$$\rho \overline{u'_j T'} = \quad \text{Equation 6}$$

$$\frac{k/\varepsilon}{c_{1\theta} + \frac{1}{2}\left(\frac{P_k}{\varepsilon} - 1\right)} \left( \rho \tau_{jm} \frac{\partial T}{\partial x_m} - (1 - c_{2\theta}) \rho \overline{u'_j T'}^{(N-1)} \frac{\partial u_j}{\partial x_m} - \right.$$

$$\left. c_{1\theta,w} (\rho \overline{u'_j T'}^{(N-1)} \cdot \hat{n}_m) \hat{n}_j \frac{\sqrt{k}}{d_w} \right)$$

In Equation 6, $d_w$ represents a distance to the wall of the nozzle and $\hat{n}_j$ is defined above in relation Equation 2. Examples disclosed herein solve Equation 6 iteratively with relaxation to avoid the matrix inversion problems of Dupland and Bezard (Dupland, L., Bezard, H., "A New Explicit Algebraic Model for Turbulent Heat Flex Prediction," *HEFAT*2005, Paper Number DL1, 4th International Conference on Heat Transfer, Fluid Mechanics and Thermodynamices, Cairo, Egypt, 2005). Examples disclosed herein include a relaxation coefficient $\omega_r$ of 10%. The superscript N and N−1 in Equations 6 and 7 denote the turbulent heat flux vector on the previous and current iterations. The star superscript denotes the turbulent heat flux vector calculated with Equation 6 before being relaxed by Equation 7:

$$\rho\overline{u_j'T'}^{(N)} = \rho\overline{u_j'T'}^{*}\omega_r + \rho\overline{u_j'T'}^{(N-1)}(1-\omega_r) \qquad \text{Equation 7:}$$

The turbulent heat flux should diminish along with turbulent kinetic energy k. If k is less than $10^{-10}$, a zero is returned instead of evaluating either Equations 6 or 7 on that cell. Similarly, the value of turbulent dissipation $\varepsilon$ is limited by its freestream value. These safeguards ensure that a reasonable value of k and $\varepsilon$ are used during the update of the turbulent heat flux vector and prevent division by zero.

In regions of poor grid quality, the model has shown signs of instability. Equation 5 can become singular under some circumstances so that Equation 6 does not lead to a convergent iterative sequence. To avoid this problem, the result of Equation 7 is limited using a local maximum estimated from a chosen minimum turbulent Prandtl number of $Pr_{\tau,min}=0.4$. The magnitude of the turbulent heat flux vector is limited to 20 times this local limit:

$$\left|\rho\overline{u_j'T'}\right| \leq 20\frac{\mu_T|\nabla T|}{Pr_{\tau,min}} \qquad \text{Equation 8}$$

The turbulent heat flux vector is known from Equations 6 and 7 and can be substituted into the energy equation. Examples disclosed herein show that this coupling may delay or inhibit convergence. Therefore, instead of directly applying the resulting turbulent heat flux vector, examples disclosed herein calculate a local turbulent Prandtl number, as described below. Further, examples disclosed herein apply the local turbulent Prandtl number through the existing eddy diffusivity approach. Converting the turbulent heat flux vector to a turbulent Prandtl number eliminates any heat flux orthogonal to the temperature gradient and helps stabilize the model. After a variable $Pr_\tau$ solution has partially converged, examples disclosed herein can apply the heat flux directly in the energy equation with little disturbance to the solution. Examples disclosed herein demonstrate that cases, containing boundary and free shear layers, have not shown any appreciable improvement in accuracy when switching from the variable $Pr_\tau$ approach to the direct application of the turbulent heat flux vector. Therefore, the variable $Pr_\tau$ approach is desirable and applied in example results shown herein.

The turbulent Prandtl number $Pr_\tau$ may be solved for using Equation 1. Since eddy diffusivity applies the turbulent heat flux vector in the direction of the mean temperature gradient, the turbulent heat flux vector provided by the algebraic model is dotted with the temperature gradient to compute an effective local turbulent Prandtl number. Note that the absolute value is used to ensure that $Pr_\tau$ is always positive:

$$Pr_\tau = \frac{\mu_T|\nabla T|^2}{|\rho\overline{u_j'T'}\cdot\nabla_j T|} \qquad \text{Equation 9}$$

To safeguard against division by zero, Equation 9 is bounded by a minimum turbulent Prandtl number, $Pr_{\tau,min}$. The default value of $Pr_{\tau,min}$ is 0.4, which is reasonable for a mixing layer. Similarly, the denominator of Equation 9 is limited to be greater than $10^{-12}$ to prevent division by zero.

Figure 6:
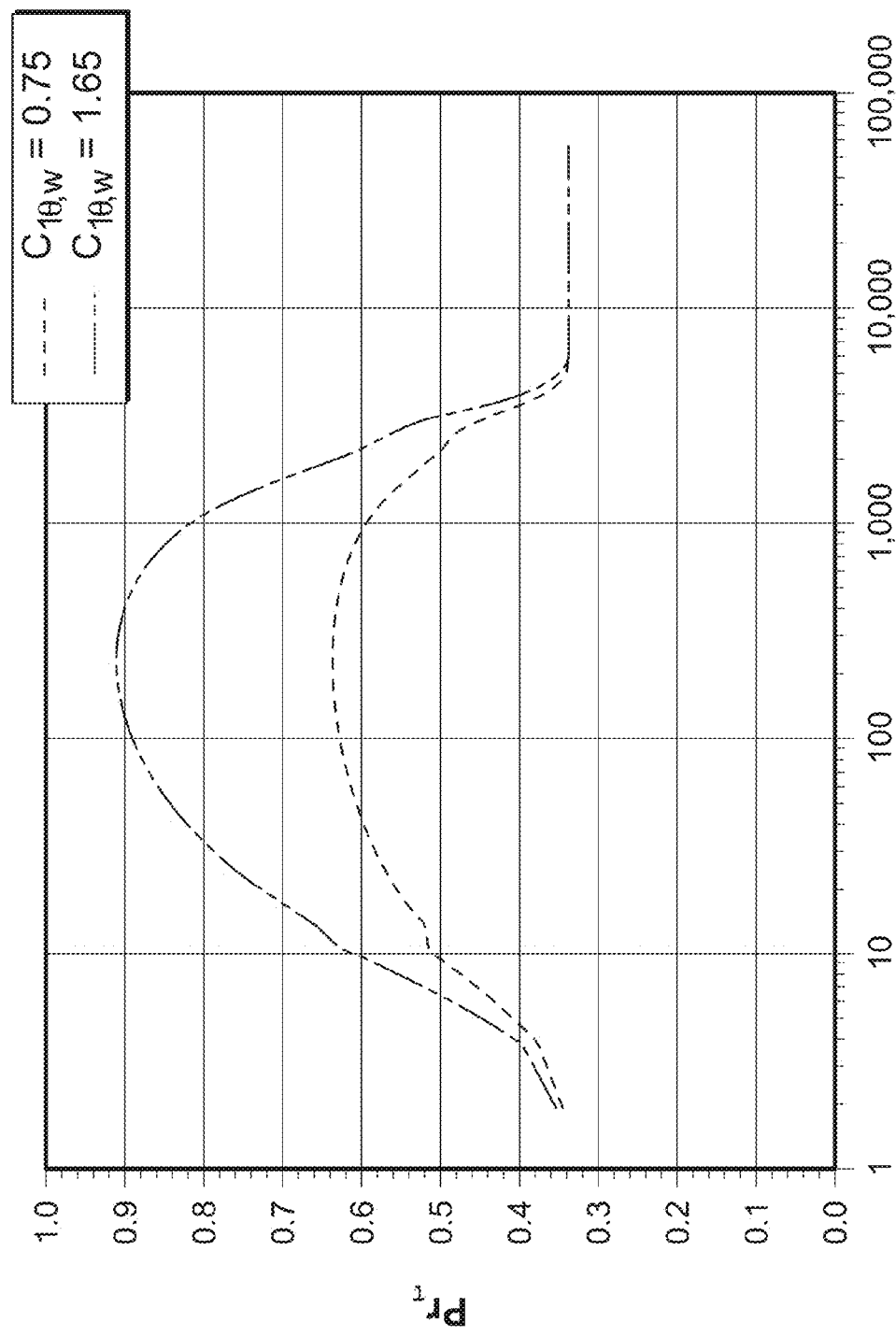
FIG. 6 is a second graph illustrating a distribution of the turbulent Prandtl number in a boundary layer.

Thakre and Joshi (Thakre, S. S., Joshi, J. B., "CFD Modeling of Heat Transfer in Turbulent Pipe Flow," *AIChE Journal*, Vol. 46, No. 9, 2000) showed that the Lai-So model could be coupled with many k-ε and Reynolds stress transport models but worked best with the models of Lai & So. Examples disclosed herein recognize that this finding suggests that the Lai-So model may need to be tuned to improve accuracy with Menter's SST turbulence model, especially near the wall. Examples disclosed herein recognize that the low-Reynolds terms should be tuned to obtain $Pr_\tau=0.9$ in the log-layer. Examples disclosed herein solve the turbulent Prandtl number analytically by limiting the heat flux and temperature gradient to be normal to a flat plate. FIG. 6 is a plot of $Pr_\tau$ in the boundary layer calculated analytically using results obtained from a flow solution over an adiabatic flat plate. Given the nominal wall-reflection coefficient $c_{1\theta,w}$ of 0.75, $Pr_\tau$ reaches a maximum of 0.63 within the log-layer ($y^+=250$). A coefficient of 1.65 is necessary to achieve $Pr_\tau=0.9$ at the same location.

Figure 7:
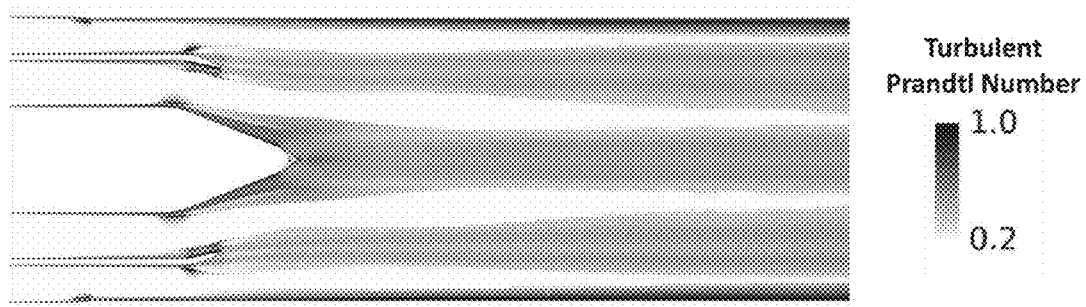
FIG. 7 is a distribution view of the turbulent Prandtl number.
Figure 8:
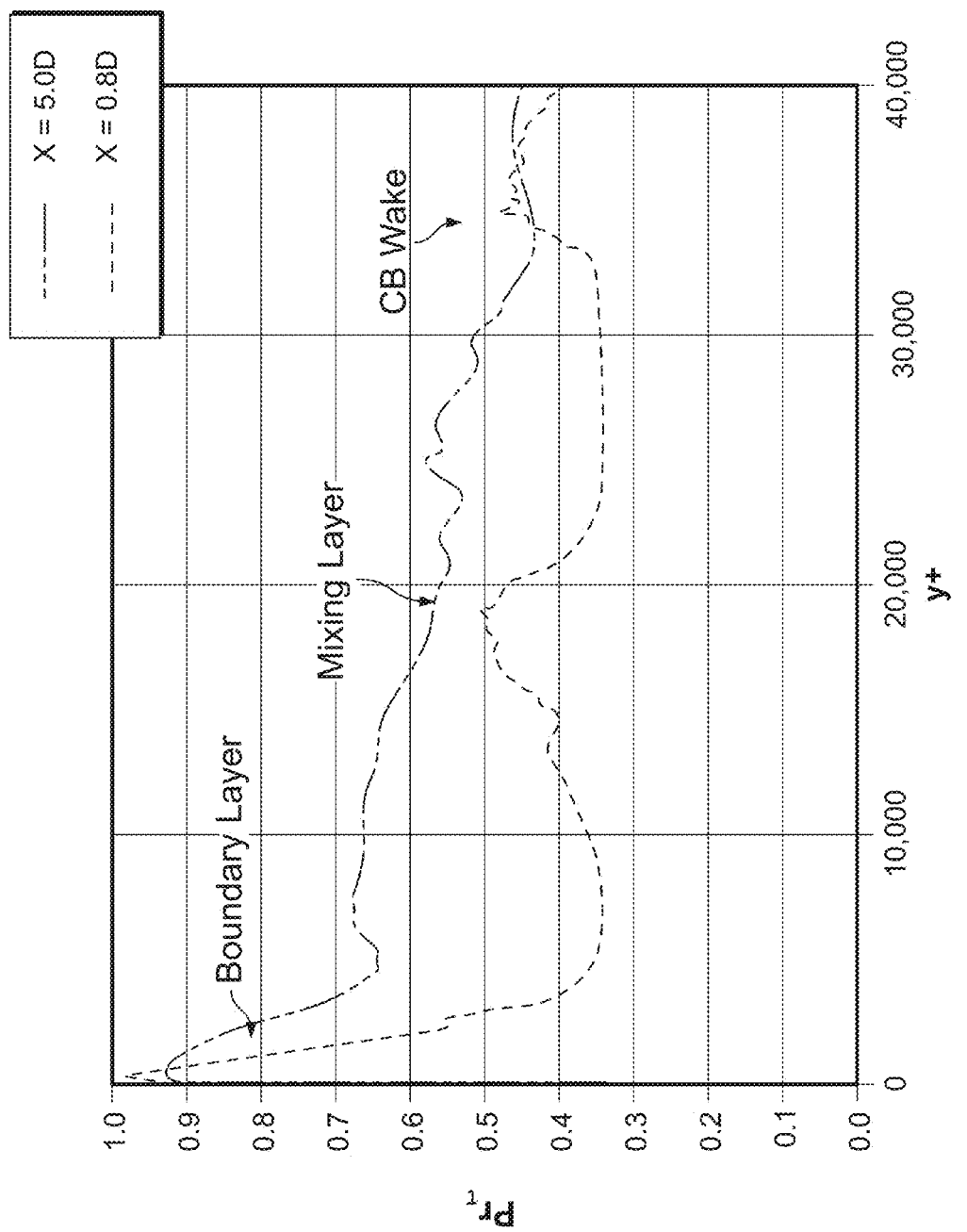
FIG. 8 is a graph illustrating a distribution of the turbulent Prandtl number in a coannular duct.

After tuning the model to achieve the desired boundary layer behavior, examples disclosed herein verify that the model produces $Pr_\tau$ near 0.4 in a mixing layer and near 0.9 in a boundary layer using the coannular test case. The distribution of $Pr_\tau$ is shown in FIG. 7 for the coannular. This image can be compared to those shown in FIG. 5 for the Lai-So model. FIG. 8 shows the distribution of turbulent Prandtl number across the coannular duct. Two profiles are shown. The first profile shows the distribution less than half of a diameter from the splitter. Three distinct shear layers are present at this location: the boundary layer, mixing layer, and wake of the centerbody. The second profile shows the distribution another two diameters downstream, where the mixing layer has intersected the boundary layer. As the mixing layer intersects the top of the boundary layer, the variable $Pr_\tau$ model provided by examples disclosed herein increases the turbulent Prandtl number in the mixing layer due to the presence of the wall. The transition is smooth as the two shear layers join together.

Figure 9:
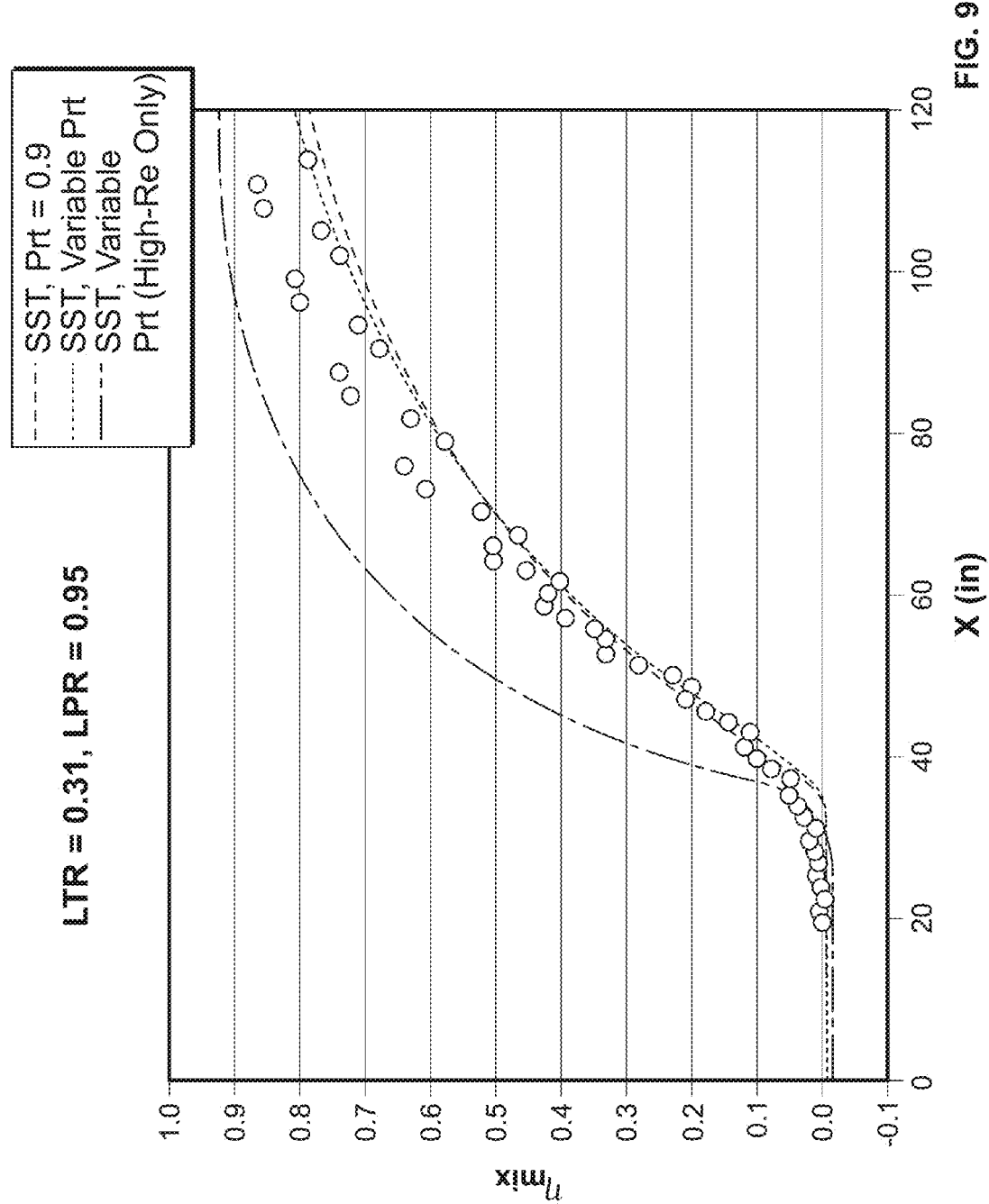
FIG. 9 is a graph illustrating coannular wall temperatures calculated with high-Reynolds number terms and low-Reynolds number terms.

FIG. 9 shows the wall temperature calculated for the coannular case using several different models. In FIG. 9, the dots correspond to experimental data points. In this case, the traditional approach ($Pr_\tau=0.9$) predicts the wall temperatures with sufficient accuracy. The solution is checked to determine if the wall temperature degrades with the introduction of the variable $Pr_\tau$ model disclosed herein. If only the high-Reynolds terms of the variable $Pr_\tau$ model disclosed herein are used, then the solution over-predicts the wall temperatures. The high-Reynolds terms increase the thermal diffusion in the mixing layer, as desired, but the heat flux remains too large in the boundary layer. When the low-Reynolds terms are also used, the turbulent Prandtl number increases near the wall and decreases the turbulent heat flux in the boundary layer. As shown in FIG. 9, the result of the example variable $Pr_\tau$ model disclosed herein is a mixture of the previous solutions, which shows a much better match with the experimental data, comparable to the solution obtained with the fixed turbulent Prandtl number. Thus, examples disclosed herein recognize that the low-Re terms are necessary when a wall is present in the flow field.

Figure 10:
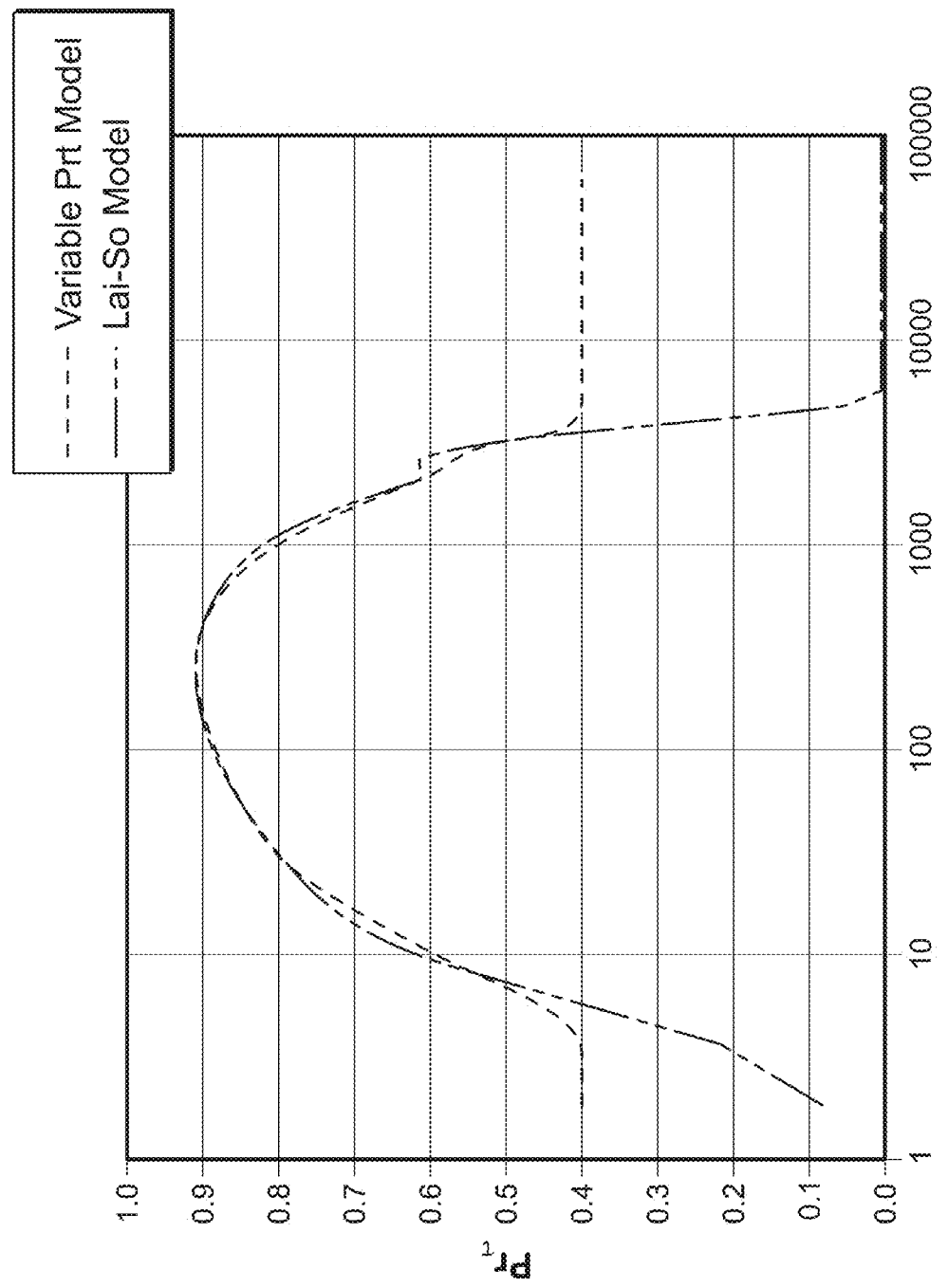
FIG. 10 is a graph illustrating a comparison of the turbulent Prandtl number calculated with a known model and with a variable turbulent Prandtl number model disclosed herein.

The example variable $Pr_\tau$ model disclosed herein is based on the Lai-So differential model. In examples disclosed herein, the advection, diffusion, and dissipation terms were neglected. FIG. 10 shows the turbulent Prandtl number in a boundary layer calculated with both the variable $Pr_\tau$ model disclosed herein and the Lai-So model. The turbulent Prandtl number was estimated for the Lai-So model using Equation 9 from a turbulent heat flux vector calculated using Equation 2 with the tuned wall-reflection coefficient. FIG. 10 shows that the two models operate in a similar manner over much of the boundary layer. In the Lai-So model, the molecular diffusion and dissipation terms increase the turbulent heat flux within the sublayer and buffer layer. This is shown by the lower value for $Pr_\tau$ in this region. The variable $Pr_\tau$ model disclosed herein returns the minimum turbulent Prandtl number $Pr_{\tau min}$ at the wall and outside of the boundary layer.

Figure 11:
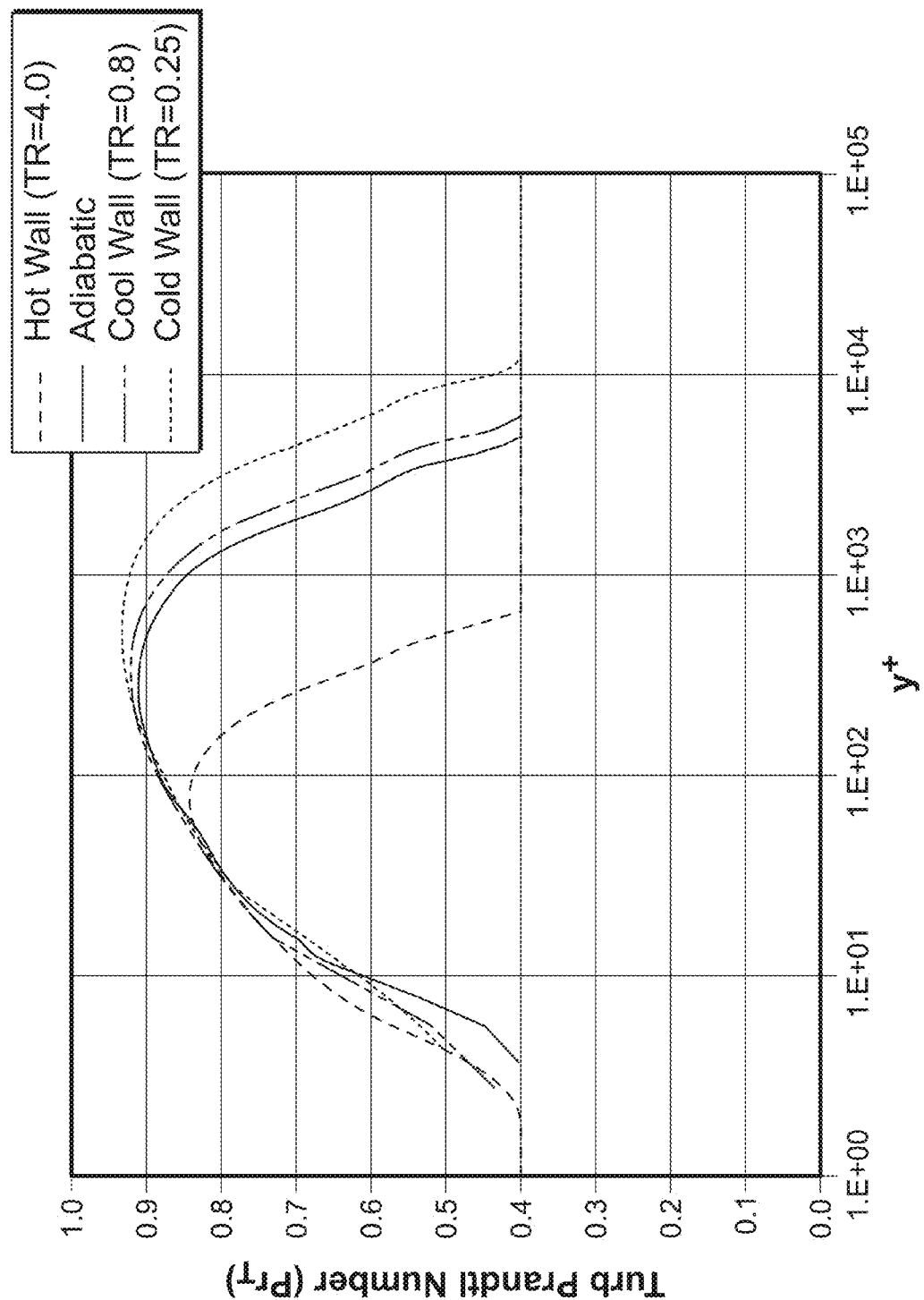
FIG. 11 is a graph illustrating the turbulent Prandtl number under different conditions.

FIG. 11 shows the turbulent Prandtl number calculated using different wall boundary conditions. Three known temperature conditions are shown along with the adiabatic wall that was used to tune the model. The four conditions produce similar distributions in the sublayer, buffer, and log layers ($y^+<100$), which shows the versatility of the model disclosed herein. The top of the boundary layer occurs at a lower $y^+$ over the hot wall, limiting the maximum $Pr_\tau$. The additional $y^+$ of the cold wall allows the model disclosed herein to increase the turbulent Prandtl number in an extended log-layer.

Figure 12A:
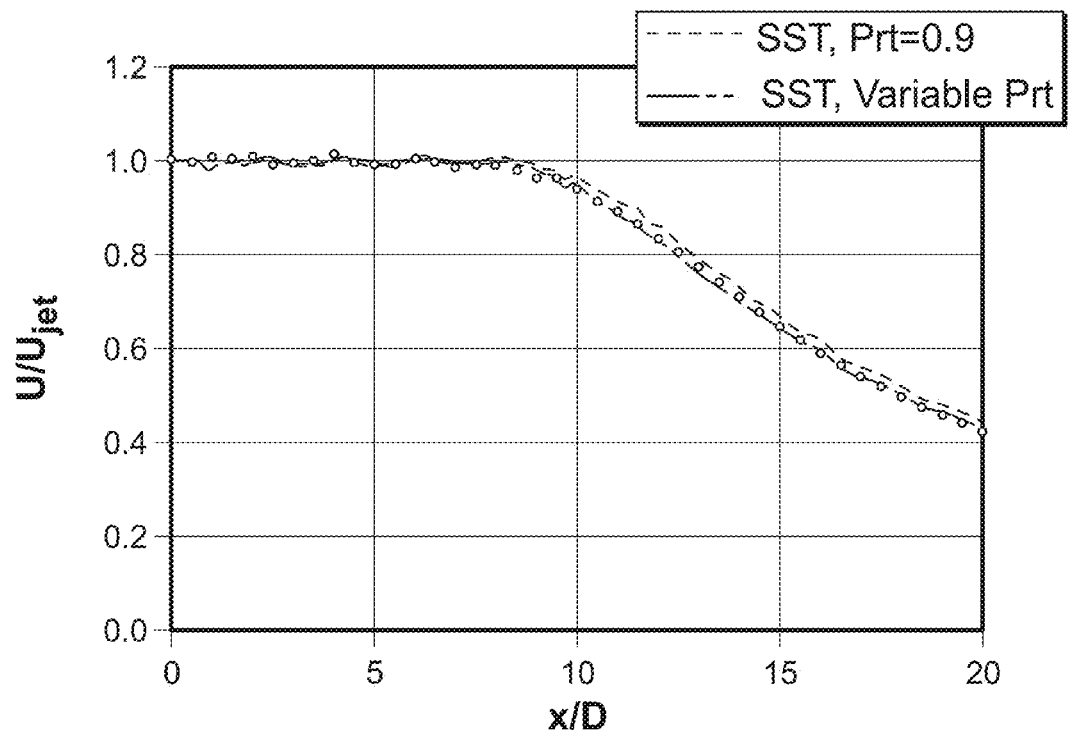
FIG. 12A is a graph illustrating effects of a heat flux model on velocity.
Figure 12B:
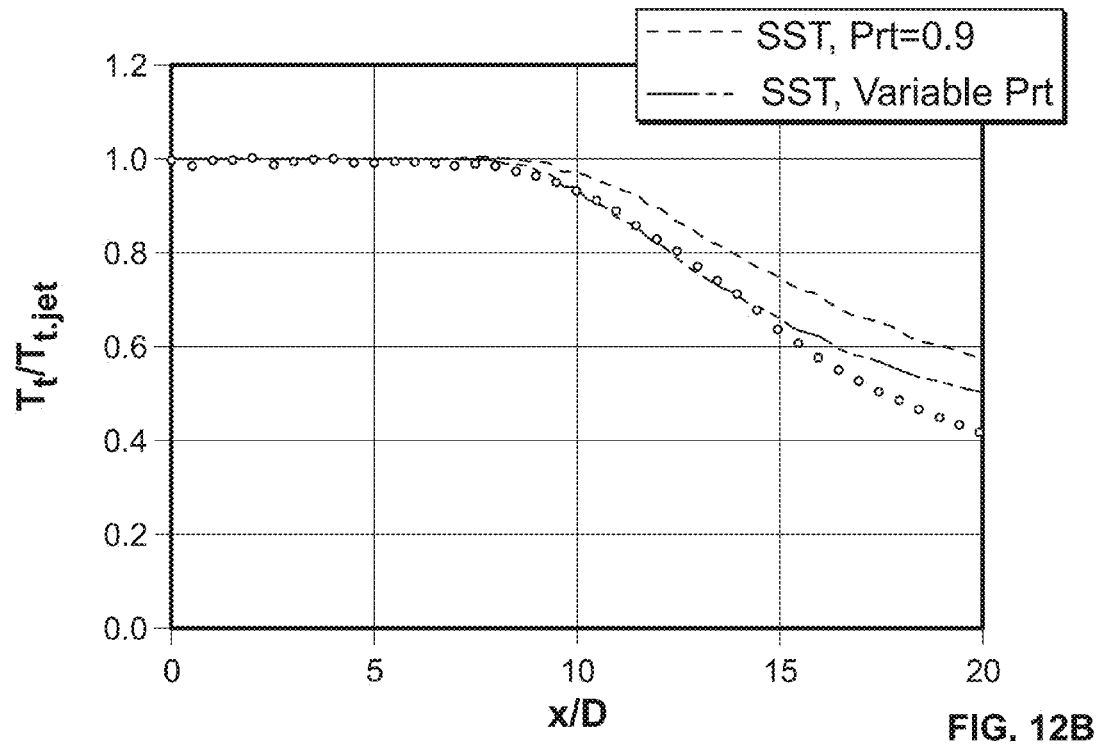
FIG. 12B is a graph illustrating effects of the heat flux model on total temperature.

As an example of the improvements provided by the examples disclosed herein are demonstrated by testing. For example, Seiner (Seiner, J. M., Ponton, M. K., Jansen, B. J., Lagen, N. T., "The Effect of Temperature on Jet Noise Emission," *AIAA Paper* 92-02-046, DGLR/AIAA 14th Aeroacoustics Conference, 11-14 May 1992, Aachen, Germany, 1992) investigated an axisymmetric nozzle for jet acoustics. Seiner collected data for several jet velocities at Mach 2, the design Mach number of the nozzle. CFD results are shown in FIGS. 12A and 12B to Seiner's data at Mach 2 and 2000° R, exhausting into ambient surroundings (529° R). FIG. 12A illustrates effects of the turbulent heat flux model on velocity ($U/U_{jet}$) and FIG. 12B illustrates effects of the turbulent heat flux model on total temperature ($T_t/T_{t,jet}$) where $T_{t,jet}$ is 2009° R. The dots of FIGS. 12A and 12B represent experimental data points. The centerline velocity and total temperature were calculated using Menter's SST turbulence model with compressibility correction of Suzen and Hoffman (Suzen, Y. B., Hoffmann, K. A., "Investigation of Supersonic Jet Exhaust Flow by One- and Two Equation Turbulence Models," *AIAA*-1998-16215, $36^{TH}$ Aerospace Sciences Meeting and Exhibit, 12-15 Jan. 1998, Reno, Nev., 1998). The velocity result matches the data well for both the traditional approach ($Pr_\tau=0.9$) and the variable $Pr_\tau$ model disclosed herein. The total temperature is improved by using the variable $Pr_\tau$ model disclosed herein up to 14 diameters downstream of the nozzle.

Many methods are known to model the turbulent transport of heat. The eddy diffusivity model is the most popular approach because of its simplicity and history with the CFD community. Many approaches change the turbulent Prandtl number when switching between wall-bounded and free shear layers. For instance, Birch (Birch, S. F., Lyubimov, D. A., Secundov, A. N/, Yakubovsky, K. Y., "Numerical Modeling Requirements for Coaxial and Chevron Nozzle Flows," *AIAA* 2003-3287, 9th AIAA/CEAS Aeroacoustics Conference and Exhibit, 12-14 May 2003, Hilton Head, S.C.) suggests using $Pr_\tau=0.9$ near the wall, $Pr_\tau=0.4$ in the potential core, and $Pr_\tau=0.7$ in the downstream mixing layer. Such a model is appropriate but difficult to implement on an arbitrary geometry.

However, examples disclosed herein provide a variable $Pr_\tau$ model from terms in the Lai-So model. The variable $Pr_\tau$ model provided by examples disclosed herein retains the wall-reflection term so that $Pr_\tau$ is increased within the boundary layer while keeping lower values (more heat flux) in the mixing layer. The turbulent heat flux vector is updated throughout the solution provided by the examples disclosed herein and used to compute a local $Pr_\tau$ which is applied through the existing eddy diffusivity model.

Using the examples disclosed herein, a consistent $Pr_\tau$ profile was demonstrated for boundary layers on adiabatic, hot, and cold walls. The algebraic model disclosed herein was shown to improve the temperature distribution in an axisymmetric jet without changing the velocity distribution. Examples disclosed herein demonstrate that the low-Reynolds number terms are used to correctly model the wall temperatures.

Figure 13:
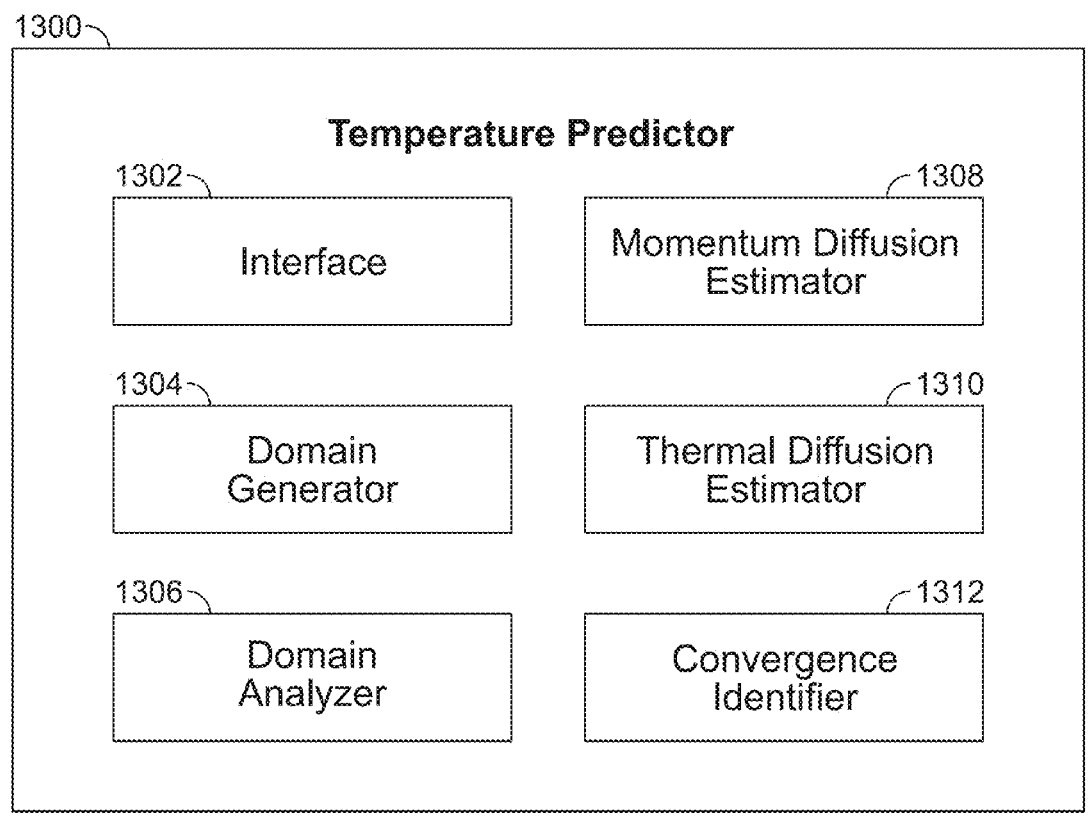
FIG. 13 is a block diagram of an example implementation of an example temperature predictor constructed in accordance with teachings of this disclosure.

FIG. 13 is a block diagram of an example temperature predictor or calculator 1300 constructed in accordance with teachings of this disclosure. The example temperature predictor 1300 of FIG. 13 predicts surface temperatures of a nozzle such as, for example, the nozzle 110 of FIG. 1. The example temperature predictor 1300 of FIG. 13 utilizes the example variable $Pr_\tau$ model disclosed above in connection with, for example, Equations 6-9 and FIGS. 2-12. By providing accurate predictions using the example variable $Pr_\tau$ model disclosed above, the example temperature predictor 1300 of FIG. 13 provides surface temperature predictions without incurring expensive experimental tests. Moreover, improvements realized by the example variable $Pr_\tau$ model disclosed above over previous models enable the example temperature predictor 1300 of FIG. 13 to reduce cost of computations by significant amounts (e.g., thousands) of CPU hours, as the example variable $Pr_\tau$ model disclosed above provides robust computation.

The example temperature predictor 1300 of FIG. 13 includes an interface 1302 to receive information indicative of certain aspects of, for example, the nozzle 110 of FIG. 1 or any other apparatus for which surface temperature predictions are desired. In the illustrated example of FIG. 13, the interface 1302 receives and/or otherwise obtains a definition of a nozzle geometry, engine operating conditions, and flight conditions associated with the nozzle 110. In some examples, the example interface 1302 obtains the information from designers and/or engineers in the process of developing the nozzle 110.

The example temperature predictor 1300 of FIG. 13 includes a domain generator 1304 to use the information obtained by the interface 1302 to generate a domain representative of the nozzle 110 being analyzed. In particular, the example domain generator 1304 of FIG. 13 uses the nozzle geometry to define boundaries of the domain. Further, the example domain generator 1304 of FIG. 13 uses the engine operating condition and the flight conditions as properties flowing into the domain. The example domain generator 1304 of FIG. 13 breaks the domain into smaller, simpler volumes, which are referred to as cells.

The example temperature predictor 1300 of FIG. 13 includes a domain analyzer 1306 to enforce conversation of mass, momentum, and energy throughout the domain. In particular, the example domain analyzer 1306 of FIG. 13 solves the Reynolds-averaged Navier-Stokes equations for the domain. The solution procedure is based on the physical principle that the mass, momentum, and energy that leaves one cell, through one of its faces, passes into another cell, through one of its faces. The solution to the governing equations is found by the example domain analyzer 1306 of FIG. 13 by determining the values of mass, momentum, and energy in each cell of the domain that result in a balancing of these fluxes throughout the domain.

The example temperature predictor 1300 of FIG. 13 includes a momentum diffusion estimator 1308 to estimate momentum diffusion due to turbulence. In the illustrated example of FIG. 13, the momentum diffusion estimator 1308 utilizes a turbulence model to generate the estimation. Examples of turbulence models include the one-equation SA turbulence model (Spalart, P. R., Allmaras, S. R., "A One-Equation Turbulence Model for Aerodynamic Flows," *Recherche Aerospatiale*, No. 1, 1994, pp. 5-21), Menter's two-equation SST turbulence model (Menter, F. R., "Two-Equation Eddy-Viscosity Turbulence Models for Engineering Applications," *AIAA Journal*, Vol. 32, No. 8, August 1994, pp. 1598-1605), and other RANS turbulence models.

The example temperature predictor 1300 of FIG. 13 includes a thermal diffusion estimator 1310 to estimate thermal diffusion due to turbulence. As described above, known systems estimate thermal diffusion via simplistic models that assume thermal diffusion to be proportional to the momentum diffusion. That is, known systems assume that thermal diffusion and momentum diffusion are related by a constant multiplier. In contrast to these known systems, the example thermal diffusion estimator 1310 of FIG. 13 enables a higher fidelity approach than these known systems. In particular, the example thermal diffusion estimator 1310 of FIG. 13 uses the variable $Pr_\tau$ model disclosed above in connection with, for example, Equations 6-9 and FIGS. 2-12 to generate the estimations. Advantageously, the variable $Pr_\tau$ model utilized by the example thermal diffusion estimator 1310 of FIG. 13 does not rely on a user-specified constant turbulent Prandtl number and requires no additional transport equations to be solved. Accordingly, the example thermal diffusion estimator 1310 provides more accurate estimations than a constant $Pr_\tau$ model while consuming less computational resources than more complex differential models.

In the illustrated example of FIG. 13, the estimate of turbulent diffusion generated by the example thermal diffusion estimator 1310 is provided to the domain analyzer 1306 as a feedback loop. The example domain analyzer 1306 of FIG. 13 uses the thermal diffusion estimate to re-evaluate the fluxes of mass, momentum and energy to determine correction(s) to be made to the solution values stored in each cell. That is, the thermal diffusion estimate is used to adjust the appropriate values of the fluxes of mass, momentum, and energy.

This re-evaluation and correction continues until the fluxes are in balance. The example temperature predictor 1300 of FIG. 13 includes a convergence identifier 1312 to determine whether the fluxes are in balance (e.g., whether the current values cause convergence). If so, the solution has been found and the convergence identifier 1312 ends the analysis. That is, if the convergence identifier 1312 determines that the fluxes are in balance, the temperature predictor 1300 bases the temperature prediction on the current values. Conversely, if the fluxes are not in balance, the example momentum diffusion estimator 1308 generates a new estimate of the momentum diffusion due to turbulence based on the new values of the fluxes of mass, momentum and energy. Further, the example thermal diffusion estimator 1310 generates a new estimate of the thermal diffusion based on the new values. The example domain analyzer 1306 of FIG. 13 makes any correction(s), as before, and the convergence identifier 1312 determines whether the fluxes are in balance. This continues until the fluxes are in balance, thereby indicating that a solution has been reached.

While an example manner of implementing the temperature predictor 1300 is illustrated in FIG. 13, one or more of the elements, processes and/or devices illustrated in FIG. 13 may be combined, divided, re-arranged, omitted, eliminated and/or implemented in any other way. Further, the example interface 1302, the example domain generator 1304, the example domain analyzer 1306, the example momentum diffusion estimator 1308, the example thermal diffusion estimator 1310, the example convergence identifier 1312 and/or, more generally, the example temperature predictor 1300 of FIG. 13 may be implemented by hardware, software, firmware and/or any combination of hardware, software and/or firmware. Thus, for example, any of the example interface 1302, the example domain generator 1304, the example domain analyzer 1306, the example momentum diffusion estimator 1308, the example thermal diffusion estimator 1310, the example convergence identifier 1312 and/or, more generally, the example temperature predictor 1300 of FIG. 13 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 1302, the example domain generator 1304, the example domain analyzer 1306, the example momentum diffusion estimator 1308, the example thermal diffusion estimator 1310, the example convergence identifier 1312 and/or, more generally, the example temperature predictor 1300 of FIG. 13 is/are hereby expressly defined to include a tangible computer readable storage device or storage disk such as a memory, a digital versatile disk (DVD), a compact disk (CD), a Blu-ray disk, etc. storing the software and/or firmware. Further still, the example temperature predictor 1300 of FIG. 13 may include one or more elements, processes and/or devices in addition to, or instead of, those illustrated in FIG. 13, and/or may include more than one of any or all of the illustrated elements, processes and devices.

Figure 14:
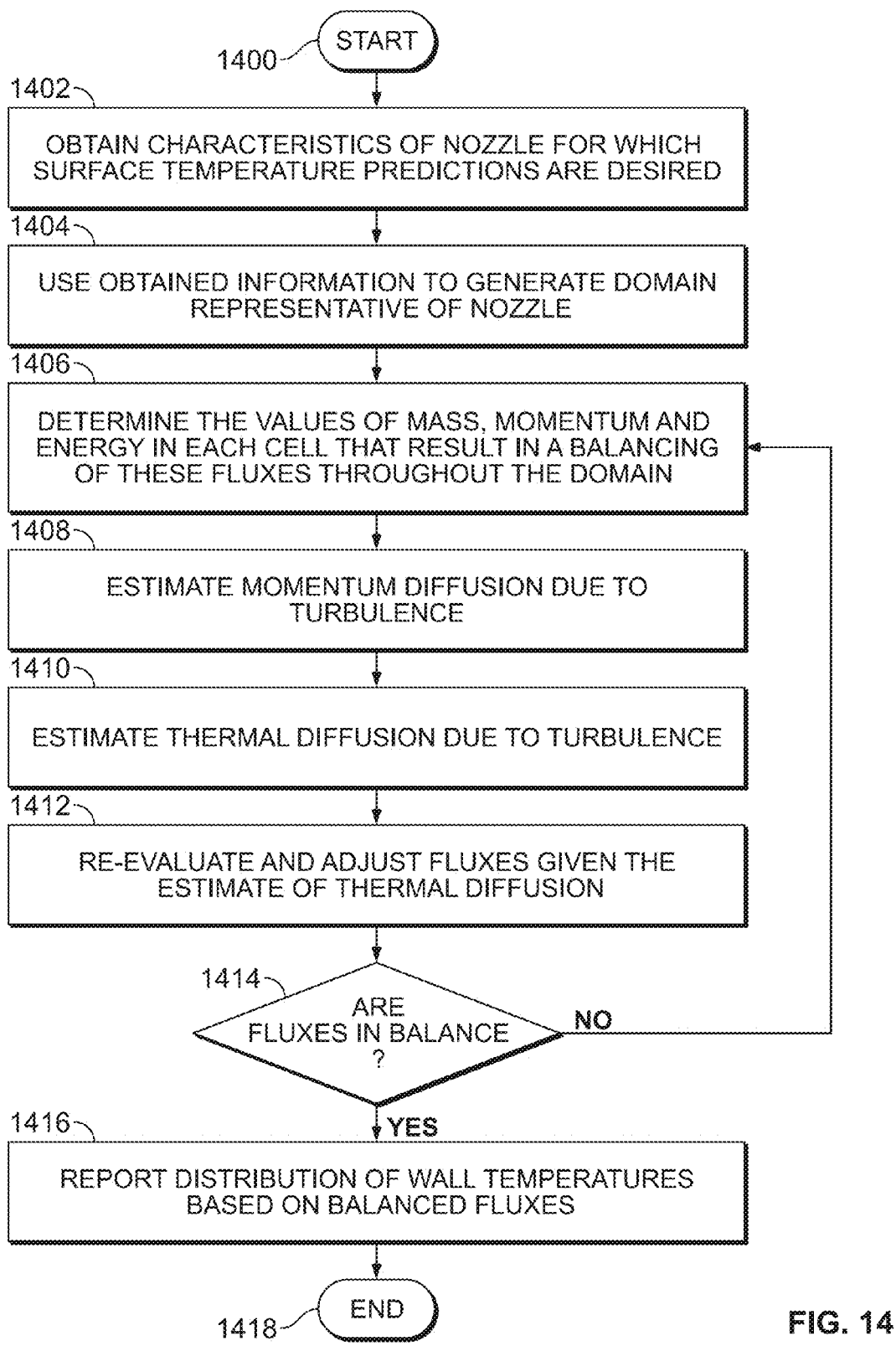
FIG. 14 is a flowchart representative of an example method that may be performed to implement the example temperature predictor of FIG. 13.

FIG. 14 is a flowchart representative of an example method that may be used to implementing the example temperature predictor 1300 of FIG. 13. In the examples of FIG. 14, the method may be implemented using machine readable instructions that comprise one or more programs for execution by a processor such as the processor 1512 shown in the example processor platform 1500 discussed below in connection with FIG. 15. The programs may be embodied in software stored on a tangible computer readable storage medium such as a CD-ROM, a floppy disk, a hard drive, a digital versatile disk (DVD), a Blu-ray disk, or a memory associated with the processor 1512, but the entire program and/or parts thereof could alternatively be executed by a device other than the processor 1512 and/or embodied in firmware or dedicated hardware. Further, although the example programs are described with reference to the flowchart illustrated in FIG. 14, many other methods of implementing the example temperature predictor 1300 of FIG. 13 may alternatively be used. For example, the order of execution of the blocks may be changed, and/or some of the blocks described may be changed, eliminated, or combined.

As mentioned above, the example method of FIG. 14 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 14 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example of FIG. 14 begins with, for example, an initiation of a workflow procedure in which temperature characteristics (e.g., surface temperatures of a nozzle wall) for a nozzle and/or a nozzle design are desired by, for example, designers and/or engineers of an aircraft propelled by one or more jet engines (block 1400). That is, the example of FIG. 14 corresponds to an implementation of the example temperature predictor 1300 of FIG. 13, which utilizes the example variable $Pr_\tau$ model disclosed above in connection with, for example, Equations 6-9 and FIGS. 2-12. In the example of FIG. 14, the interface 1302 obtains characteristic information related to the nozzle for which temperature estimations and/or modeling is desired (block 1402). The characteristic information obtained by the interface 1302 includes, for example, a nozzle geometry, engine operating conditions, and flight conditions associated with the nozzle.

In the example of FIG. 14, the domain generator 1304 generates a domain representative of the nozzle being analyzed based on the information obtained via the interface 1302 (block 1404). The domain generated by the example domain generator 1304 includes boundaries based on the nozzle geometry and flow properties based on the engine operating conditions and the flight conditions. The domain generated by the example domain generator 1304 includes cells that represent portions of the domain. The domain analyzer 1306 enforces conversation of mass, momentum, and energy throughout the domain by solving the Reynolds-averaged Navier-Stokes equations for the domain (block 1406). The solution procedure is based on the physical principle that the mass, momentum, and energy that leaves one cell, through one of its faces, passes into another cell, through one of its faces. The solution to the governing equations is found by the example domain analyzer 1306 by determining the values of mass, momentum, and energy in each cell of the domain that result in a balancing of these fluxes throughout the domain (block 1406). In the example of FIG. 14, the momentum diffusion estimator 1308 estimates momentum diffusion due to turbulence based on a turbulence model such as, for example, the one-equation SA model or Menter's two-equation SST model (block 1408).

In the example of FIG. 14, the thermal diffusion estimator 1308 estimates thermal diffusion due to turbulence (1410) based on the variable turbulent Prandtl number model disclosed above. In the example of FIG. 14, the domain analyzer 1306 uses the estimations generated by the thermal diffusion estimator 1310 to re-calculate or re-evaluate the fluxes of mass, momentum and energy to determine correction(s) to be made to the solution values stored in each cell (block 1412). If the result of the re-calculation or re-evaluation is that the fluxes are in balance, as determined by the convergence identifier 1312 (block 1414), the solution has been found and the distribution of the wall temperatures is reported based on the balanced fluxes (block 1416). That is, if the convergence identifier 1312 determines that the fluxes are in balance, the temperature predictor 1300 bases the temperature prediction on the current values. Conversely, if the fluxes are not in balance, control proceeds to block 1406, where a new estimate of the momentum diffusion due to turbulence is calculated based on the new values of the fluxes of mass, momentum and energy. The example of FIG. 14 ends when the solution has been reached and the distribution has been reported (block 1418).

Figure 15:
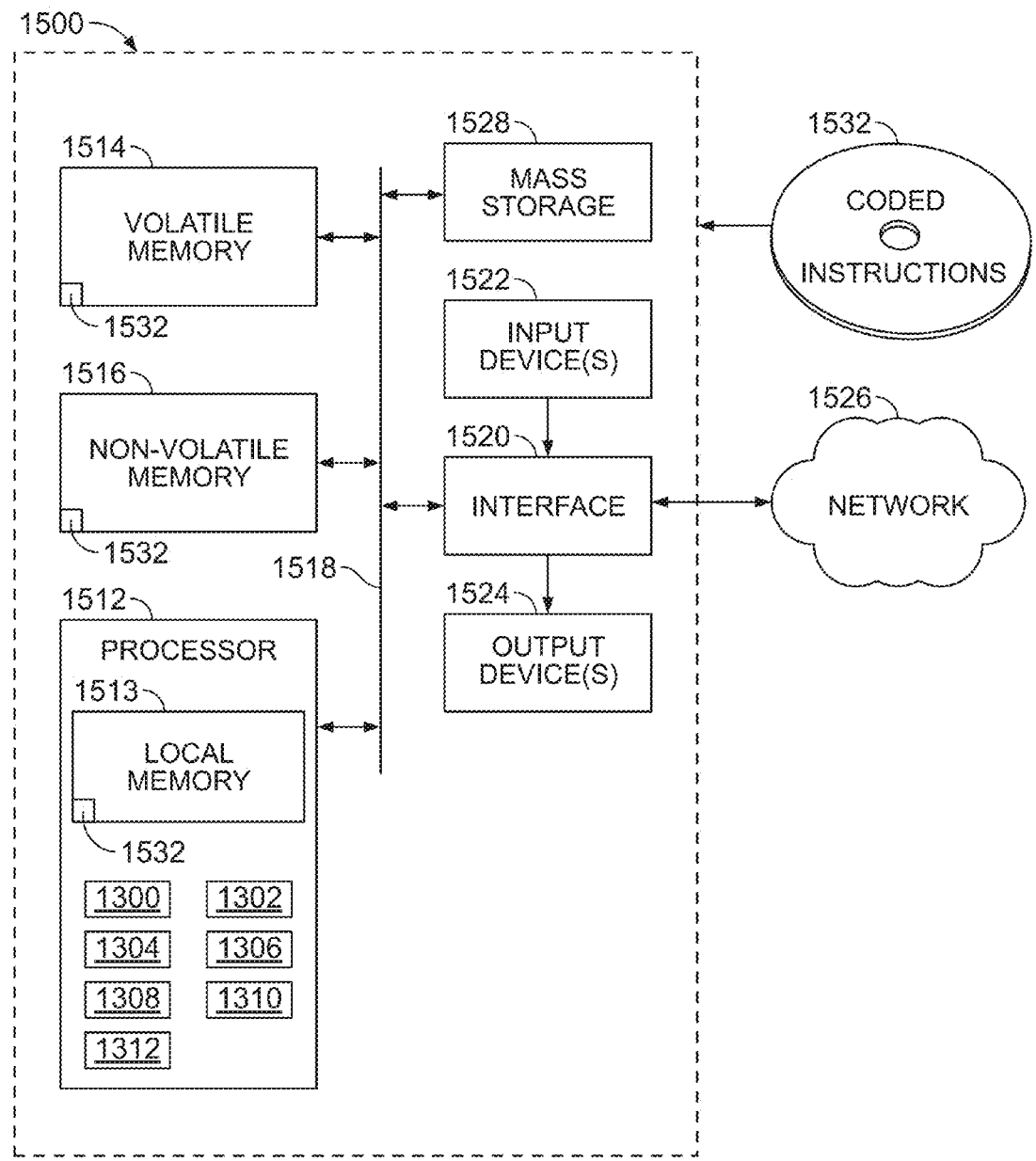
FIG. 15 is a block diagram of an example processing system implementing the example temperature predictor of FIG. 13 by performing the example method of FIG. 14.

FIG. 15 is a block diagram of an example processor platform 1500 capable of executing instructions to implement the method of FIG. 14 and the example temperature predictor 1300 of FIG. 13. The processor platform 1500 can be, for example, a server, a personal computer, a mobile device (e.g., a cell phone, a smart phone, a tablet such as an iPad®), a personal digital assistant (PDA), an Internet appliance, a media player (e.g., a DVD player, a CD player, a digital video recorder, a Blu-ray player, etc.), a gaming console, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer. In some examples, the processor 1512 implements the example temperature predictor 1300, the example interface 1302, the example domain generator 1304, the example domain analyzer 1306, the example momentum diffusion estimator 1308, the example thermal diffusion estimator 1310, and/or the example convergence identifier 1312 of FIG. 13.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

Coded instructions 1532 to implement the method of FIG. 14 may be stored in the mass storage device 1528, in the volatile memory 1514, in the non-volatile memory 1516, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
receiving, at a processor, characteristics of a nozzle of an aircraft to be tested, the characteristics input by a person via an interface, the characteristics including a shape of the nozzle;
generating, via the processor, a domain representation of the nozzle based on the characteristics of the nozzle, the domain representation divided into a plurality of cells;
estimating, via the processor, momentum diffusion due to turbulence associated with the nozzle based on the determined characteristics;
estimating, via the processor, thermal diffusion due to the turbulence associated with the nozzle based on the estimated momentum diffusion and a spatially varying turbulent Prandtl number, wherein the spatially varying turbulent Prandtl number is calculated using the equation $$Pr_\tau = \frac{\mu_\tau |\nabla T|^2}{|\rho \overline{u'_j T'} \cdot \nabla_j T|},$$

wherein $\mu_\tau$ is turbulent viscosity, T is static temperature, $\rho$ is density, and $\overline{u'_j T'}$ is a turbulent heat flux vector, and wherein the turbulent heat flux vector is calculated using the equations $$\rho \overline{u'_j T'}^* = \frac{k/\varepsilon}{c_{1\theta} + \frac{1}{2}\left(\frac{P_k}{\varepsilon} - 1\right)}$$

$$\left(\rho \tau_{jm} \frac{\partial T}{\partial x_m} - (1 - c_{2\theta})\rho \overline{u'_m T'}^{(N-1)} \frac{\partial u_j}{\partial x_m} - c_{1\theta,w}\left(\rho \overline{u'_m T'}^{(N-1)} \cdot \hat{n}_m\right)\hat{n}_j \frac{\sqrt{k}}{d_w}\right)$$

and $\rho \overline{u'_j T'}^{(N)} = \rho \overline{u'_j T'}^* \omega_r + \rho \overline{u'_j T'}^{(N-1)}(1-\omega_r)$, wherein the star superscript denotes the turbulent heat flux vector before relaxation, $k/\varepsilon$ is turbulence dissipation time, $\varepsilon/k$ is dissipation rate, $C_{1\theta}=3.0$, $P_k$ is rate of production of turbulent kinetic energy, $\varepsilon$ is rate of dissipation of turbulent kinetic energy, $x_m$ is a coordinate location, $C_{2\theta}=0.4$, $C_{1\theta,w}=0.75$, $\hat{n}_j$ is a wall normal vector of a nearest wall face, k is turbulent kinetic energy, $d_w$ represents a distance of the nozzle from a wall, the superscript N and N-1 denotes the turbulent heat flux vector on previous and current iterations, and $\omega_r$ is a relaxation coefficient of 10%;
determining, via the processor, using an energy equation, a temperature distribution throughout the domain representation of the nozzle based on the estimated thermal diffusion; and
using the temperature distribution in designing the nozzle.

2. The method as defined in claim 1, wherein the temperature distribution includes a distribution of wall temperature for the nozzle.

3. The method as defined in claim 1, wherein the characteristics of the nozzle further include at least one of engine operating conditions of an aircraft associated with the nozzle or flight conditions of the aircraft.

4. The method as defined in claim 1, wherein the energy equation enforces conservation of mass, momentum, and energy in each of the cells of the domain representation of the nozzle.

5. The method as defined in claim 4, further including adjusting, via the processor, at least one of the mass, the momentum, or the energy of at least one of the cells based on the estimated thermal diffusion.

6. A tangible computer readable storage medium comprising instructions that, when executed, cause a machine to at least:
determine characteristics of a nozzle of an aircraft for a test based on input received from a person via an interface;
generate a domain representation of the nozzle based on the characteristics of the nozzle, the domain representation divided into a plurality of cells;
estimate momentum diffusion due to turbulence associated with the nozzle based on the determined characteristics;
estimate thermal diffusion due to the turbulence associated with the nozzle based on the estimated momentum diffusion and a spatially varying turbulent Prandtl number, wherein the spatially varying turbulent Prandtl number is calculated using the equation $$Pr_\tau = \frac{\mu_\tau |\nabla T|^2}{|\rho \overline{u'_j T'} \cdot \nabla_j T|},$$

wherein $\mu_\tau$ is turbulent viscosity, T is static temperature, $\rho$ is density, and $\overline{u'_j T'}$ is a turbulent heat flux vector, and wherein the turbulent heat flux vector is calculated using the equations $$\rho \overline{u'_j T'}^* = \frac{k/\varepsilon}{c_{1\theta} + \frac{1}{2}\left(\frac{P_k}{\varepsilon} - 1\right)}$$

$$\left(\rho \tau_{jm} \frac{\partial T}{\partial x_m} - (1 - c_{2\theta})\rho \overline{u'_m T'}^{(N-1)} \frac{\partial u_j}{\partial x_m} - c_{1\theta,w}\left(\overline{\rho u'_m T'}^{(N-1)} \cdot \hat{n}_m\right)\hat{n}_j \frac{\sqrt{k}}{d_w}\right)$$

and $\rho \overline{u'_j T'}^{(N)} = \rho \overline{u'_j T'}^* \omega_r + \rho \overline{u'_j T'}^{(N-1)}(1-\omega_r)$, wherein the star superscript denotes the turbulent heat flux vector before relaxation, $k/\varepsilon$ is turbulence dissipation time, $\varepsilon/k$ is dissipation rate, $C_{1\theta}=3.0$, $P_k$ is rate of production of turbulent kinetic energy, $\varepsilon$ is rate of dissipation of turbulent kinetic energy, $x_m$ is a coordinate location, $C_{2\theta}=0.4$, $C_{1\theta}=0.75$, $\hat{n}_j$ is a wall normal vector of a nearest wall face, k is turbulent kinetic energy, $d_w$ represents a distance of the nozzle from a wall, the superscript N and N−1 denotes the turbulent heat flux vector on previous and current iterations, and $\omega_r$ is a relaxation coefficient of 10%; and calculate, using an energy equation, a temperature distribution throughout the domain representation of the nozzle based on the estimated thermal diffusion, such that the temperature distribution can be used in designing the nozzle.

7. The storage medium as defined in claim 6, wherein the temperature distribution includes a distribution of wall temperature for the nozzle.

8. The storage medium as defined in claim 6, wherein the characteristics of the nozzle include at least one of a geometry of the nozzle, engine operating conditions of an aircraft associated with the nozzle, or flight conditions of the aircraft.

9. The storage medium as defined in claim 6, wherein the energy equation enforces conservation of mass, momentum, and energy in each of the cells of the domain representation of the nozzle.

10. The storage medium as defined in claim 9, wherein the instructions, when executed, cause the machine to adjust at least one of the mass, the momentum, or the energy of at least one of the cells based on the estimated thermal diffusion.

11. An apparatus, comprising:
an interface to obtain characteristics of a nozzle of an aircraft to be tested;
a domain generator to generate a domain representation of the nozzle based on the characteristics of the nozzle, the domain representation divided into a plurality of cells;
a first estimator to estimate momentum diffusion due to turbulence associated with the nozzle based on the determined characteristics;
a second estimator to estimate thermal diffusion due to the turbulence associated with the nozzle based on the estimated momentum diffusion and a spatially varying turbulent Prandtl number, wherein the spatially varying turbulent Prandtl number is calculated using the equation, $$Pr_\tau = \frac{\mu_\tau |\nabla T|^2}{|\rho \overline{u'_j T'} \cdot \nabla_j T|},$$

wherein $\mu_\tau$ is turbulent viscosity, T is static temperature, $\rho$ is density, and $\overline{u'_j T'}$ is a turbulent heat flux vector, and wherein the turbulent heat flux vector is calculated using the equations $$\rho \overline{u'_j T'}^* = \frac{k/\varepsilon}{c_{1\theta} + \frac{1}{2}\left(\frac{P_k}{\varepsilon} - 1\right)}$$

$$\left(\rho \tau_{jm} \frac{\partial T}{\partial x_m} - (1 - c_{2\theta})\rho \overline{u'_m T'}^{(N-1)} \frac{\partial u_j}{\partial x_m} - c_{1\theta,w}\left(\overline{\rho u'_m T'}^{(N-1)} \cdot \hat{n}_m\right)\hat{n}_j \frac{\sqrt{k}}{d_w}\right)$$

and
$\rho \overline{u'_j T'}^{(N)} = \rho \overline{u'_j T'}^* \omega_r + \rho \overline{u'_j T'}^{(N-1)}(1-\omega_r)$, wherein the star superscript denotes the turbulent heat flux vector before relaxation, $k/\varepsilon$ is turbulence dissipation time, $\varepsilon/k$ is dissipation rate, $C_{1\theta}=3.0$, $P_k$ is rate of production of turbulent kinetic energy, $\varepsilon$ is rate of dissipation of turbulent kinetic energy, $x_m$ is a coordinate location, $C_{2\theta}=0.4$, $C_{1\theta w}=0.75$, $\hat{n}_j$, is a wall normal vector of a nearest wall face, k is turbulent kinetic energy, $d_w$ represents a distance of the nozzle from a wall, the superscript N and N−1 denotes the turbulent heat flux vector on previous and current iterations, and co, is a relaxation coefficient of 10%; and a domain analyzer to, using an energy equation, calculate a temperature distribution throughout the domain representation of the nozzle based on the estimated thermal diffusion, such that the temperature distribution can be used in designing the nozzle.

12. The apparatus as defined in claim 11, wherein the temperature distribution includes a distribution of wall temperature for the nozzle.

13. The apparatus as defined in claim 11, wherein the characteristics include at least one of a geometry of the nozzle, engine operating conditions of an aircraft associated with the nozzle, flight conditions of the aircraft.

14. The apparatus as defined in claim 11, wherein the energy equation enforces conservation of mass, momentum, and energy in each of the cells of the domain representation of the nozzle, and the domain analyzer is to adjust at least one of the mass, the momentum, or the energy of at least one of the cells based on the estimated thermal diffusion.

* * * * *